US012782765B2

(12) United States Patent
Zhang et al.

(10) Patent No.: US 12,782,765 B2
(45) Date of Patent: Nov. 3, 2026

(54) SYSTEMS AND METHODS FOR CONTROLLING MOLECULES

(71) Applicant: Purdue Research Foundation, West Lafayette, IN (US)

(72) Inventors: Chi Zhang, West Lafayette, IN (US); Mark Carlsen, Lafayette, IN (US); Matthew Clark, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 789 days.

(21) Appl. No.: 18/096,619

(22) Filed: Jan. 13, 2023

(65) Prior Publication Data

US 2023/0221591 A1 Jul. 13, 2023

Related U.S. Application Data

(60) Provisional application No. 63/299,098, filed on Jan. 13, 2022.

(51) Int. Cl.

*G02F 1/11* (2006.01)
*G01N 21/15* (2006.01)

(Continued)

(52) U.S. Cl.

CPC ............ *G02F 1/113* (2013.01); *G01N 21/15* (2013.01); *G01N 21/53* (2013.01); *G01N 21/534* (2013.01);

(Continued)

(58) Field of Classification Search

CPC .......... G02F 1/113; G02F 1/33; G01N 21/15; G01N 21/53; G01N 21/534; G01N 21/8507; G01N 22/04

(Continued)

(56) References Cited

U.S. PATENT DOCUMENTS 4,241,997 A * 12/1980 Chraplyvy ............ G01N 21/39 356/309
10,852,434 B1 * 12/2020 Hall ...................... H04N 23/56

(Continued)

FOREIGN PATENT DOCUMENTS

CN 115963514 A * 4/2023 .......... G01S 7/4802
CN 120558915 A * 8/2025 ............ G01N 21/01

(Continued)

OTHER PUBLICATIONS

International Searching Authority, ISR PCTCN2022121114, Dec. 15, 2022, p. 6 (Year: 2022).*

(Continued)

*Primary Examiner* — Stephanie E Bloss
*Assistant Examiner* — Kevin C Butler
(74) *Attorney, Agent, or Firm* — Brown Rudnick LLP; Adam M. Schoen

(57) ABSTRACT

The invention generally relates to systems and methods for controlling molecules. In certain aspects, the invention provides a system for controlling molecules, the system comprising: a first light source; a second light source; an acousto-optic modulator (AOM) coupled to the second light source; and control circuitry. In certain embodiments, the control circuitry may be configured to: receive a signal from the first light source that is interrogating a location in a sample that may contain a target molecule; compare the signal received from the first light source to a preset signal; and in the event that the signal received from the first light source meets or exceeds the preset signal, then the target molecule is present at the location in the sample and the control circuitry causes the AOM to activate the second light source to transmit light onto the location in the sample that contains the target molecule.

20 Claims, 22 Drawing Sheets

(51) Int. Cl.
*G01N 21/53* (2006.01)
*G01N 21/85* (2006.01)
*G01N 22/04* (2006.01)
*G02F 1/33* (2006.01)

(52) U.S. Cl.
CPC ......... *G01N 21/8507* (2013.01); *G01N 22/04* (2013.01); *G02F 1/33* (2013.01)

(58) Field of Classification Search
USPC .......................................................... 73/61.48
See application file for complete search history.

(56) References Cited

U.S. PATENT DOCUMENTS

| | | | | |
|---|---|---|---|---|
| 11,236,993 | B1 * | 2/2022 | Hall | G01S 7/4865 |
| 12,535,669 | B2 * | 1/2026 | Liao | G02B 21/365 |
| 2005/0244984 | A1 * | 11/2005 | Parker | G01N 21/278 436/172 |
| 2011/0109958 | A1 * | 5/2011 | Yokoi | G02B 21/06 359/385 |
| 2013/0182306 | A1 * | 7/2013 | Anhut | G02B 21/0076 359/386 |
| 2016/0238532 | A1 * | 8/2016 | Freudiger | G02B 21/16 |
| 2017/0206660 | A1 * | 7/2017 | Trail | G06T 7/30 |
| 2017/0212226 | A1 * | 7/2017 | Broers | G01S 17/894 |
| 2018/0045939 | A1 * | 2/2018 | Simpson | G02B 26/101 |
| 2018/0231372 | A1 * | 8/2018 | Trail | G06T 7/30 |
| 2018/0238794 | A1 * | 8/2018 | Kangas | G02B 3/0056 |
| 2020/0065572 | A1 * | 2/2020 | Roberts | H04N 25/00 |
| 2020/0089028 | A1 * | 3/2020 | Lange | G02F 1/113 |
| 2020/0256669 | A1 * | 8/2020 | Roth | G01S 7/497 |
| 2021/0156742 | A1 * | 5/2021 | Waldron | G01J 1/08 |
| 2022/0411856 | A1 * | 12/2022 | Narasimhan | C12Q 1/6844 |
| 2023/0129700 | A1 * | 4/2023 | Zhang | G02B 21/0048 356/301 |
| 2023/0221591 | A1 * | 7/2023 | Zhang | G02F 1/33 359/305 |
| 2024/0167877 | A1 * | 5/2024 | Lee | G01J 3/0229 |
| 2024/0219705 | A1 * | 7/2024 | Liao | G02B 21/365 |
| 2024/0230532 | A1 * | 7/2024 | Zhang | G02B 21/008 |
| 2024/0255409 | A1 * | 8/2024 | Zhao | G01N 15/1434 |
| 2025/0029291 | A1 * | 1/2025 | Choi | G06T 12/00 |
| 2025/0198913 | A1 * | 6/2025 | Yamada | G01N 21/31 |

FOREIGN PATENT DOCUMENTS

| | | | | | |
|---|---|---|---|---|---|
| CN | 120831322 | A | * | 10/2025 | |
| CN | 121171916 | A | * | 12/2025 | |
| CN | 121176846 | A | * | 12/2025 | |
| DE | 102010047353 | A1 | * | 4/2012 | G02B 21/0032 |
| EP | 4403952 | A1 | * | 7/2024 | G01S 7/4802 |
| WO | WO-2023056848 | A9 | * | 6/2023 | G01S 7/4802 |
| WO | WO-2025096054 | A1 | * | 5/2025 | G02B 21/365 |
| WO | WO-2025106610 | A1 | * | 5/2025 | G01N 21/6458 |
| WO | WO-2025147759 | A1 | * | 7/2025 | G02B 21/10 |

OTHER PUBLICATIONS

International Searching Authority, ISR PCTUS2024045076, Oct. 21, 2024, p. 1 (Year: 2024).*

International Searching Authority, Written Opinion PCTCN2022121114, Feb. 20, 2024, p. 5 (Year: 2024).*

International Searching Authority, Written Opinion PCTUS2024045076, Oct. 21, 2024, p. 18 (Year: 2024).*

David Llères et al., Detecting Protein-Protein Interactions In Vivo with FRET using Multiphoton Fluorescence Lifetime Imaging Microscopy (FLIM), urrent Protocols in Cytometry Oct. 1, 2012-Oct. 19, 2012, Oct. 2007 (Year: 2007).*

Chen et al., Excitation spectral microscopy for highly multiplexed fluorescence imaging and quantitative biosensing, Light: Science & Applications, pp. 1-12 2021 (Year: 2021).*

* cited by examiner 1a 1b

SYSTEMS AND METHODS FOR CONTROLLING MOLECULES

RELATED APPLICATION

The present application claims the benefit of and priority to U.S. provisional patent application Ser. No. 63/299,098, filed Jan. 13, 2022, the content of which is incorporated by reference herein in its entirety.

FIELD OF THE INVENTION

The invention generally relates to systems and methods for controlling molecules.

BACKGROUNDS

The advancement of microscopy technologies has revealed unprecedented details of biological processes with superb resolution and chemical information. However, the capability to control chemical processes in live cells with high spatial accuracy and molecular selectivity in real-time is still lacking. Conventional chemical treatment by culturing cells with compounds has no spatial delivery selectivity and might pose off-target effects for the accurate understanding of compound-target interactions. Genetic methods such as CRISPR and RNA interference can control the expression and activity of proteins. However, transfection and incubation require sophisticated pre-preparation and passaging processes with little temporal and spatial control. Optical tweezers and trapping can only physically manipulate a few pre-detected targets. Current laser ablation methods are based on pre-image acquisition and manual operation of laser beams to obliterate the target-of-interest. Optogenetics methods can control functions of neurons using light radiation and light-sensitive ion channels, however, require pre-imaging and demonstrate little sub-cellular precision. Thus, the existing optical manipulation technologies cannot apply to highly dynamic living biological samples to control molecular activities with high spatial accuracy and chemical specificity.

SUMMARY

In this work, we develop a real-time precision opto-control (RPOC) technology that can detect and control molecules simultaneously, selectively, and precisely at the only desired activity sites. First, during laser scanning, an optical signal is generated at a specific pixel from target molecules. Then, the detected optical signal is compared with preset values using comparator circuitry. A desired optical signal will activate an acousto-optic modulator (AOM) which is used as a fast switch to couple another laser beam to interact at the same pixel. The optical signal detection, processing, and opto-control happen within 30 ns and in real-time during laser scanning. Digital logic functions allow opto-control of molecular activities based on the logic output from multiple signal channels. RPOC can accurately detect and control biomolecules in real-time without affecting other locations in the system. It is highly chemically selective since the optical signal can be selected from a range of responses such as fluorescence and Raman. This technology offers an unprecedented way to automatically and selectively control molecular activities and chemical reactions with sub-micron spatial precision. In that manner, the invention allows for simultaneous and precise detection and control of molecules in space and time without affecting unwanted targets.

In certain aspects, the invention provides systems for controlling molecules. The system includes a first light source; a second light source; an acousto-optic modulator (AOM) coupled to the second light source; and control circuitry. The control circuitry is configured to: receive a signal from the first light source that is interrogating a location in a sample that may contain a target molecule; compare the signal received from the first light source to a preset signal; and in the event that the signal received from the first light source meets or exceeds the preset signal, then the target molecule is present at the location in the sample and the control circuitry causes the AOM to activate the second light source to transmit light onto the location in the sample that contains the target molecule.

In another aspect, the invention provides methods for controlling a molecule. The methods may involve receiving, to control circuitry, a signal from a first light source that is interrogating a location in a sample that may contain a target molecule; comparing, via the control circuitry, the signal received from the first light source to a preset signal; and in the event that the signal received from the first light source meets or exceeds the preset signal, then the target molecule is present at the location in the sample and causing, via the control circuitry, and causing an acousto-optic modulator (AOM) that is coupled to a second light source to activate the second light source to transmit light onto the location in the sample that contains the target molecule, wherein the light from the second light source controls the target molecule.

In certain embodiments of the systems and methods, the first light source and the second light source are each lasers. In certain embodiments of the systems and methods, the first light source is configured for scanning. In certain embodiments of the systems and methods, for each location, the compare process and the activate process occur within 30 nano-seconds of the receive process.

In certain embodiments of the systems and methods, in the event that the signal received from the first light source does not meet or exceed the preset signal, then the target molecule is not present at the location in the sample and the control circuitry causes the AOM to turn-off the second light source and no light is transmitted onto the location in the sample as the location does not contains the target molecule. In certain embodiments of the systems and methods, the control circuitry is configured to cause the acousto-optic modulator to operate in at least one mode selected from the group consisting of: AOM constantly on, AOM constantly off, and AOM control triggered by the compare step. In certain embodiments of the systems and methods, each location is a pixel and the light from the second laser can be focused to solely the pixel that has been determined to contain the target molecule.

In certain embodiments of the systems and methods, the pre-set signal is a voltage threshold and the signal received from the first light source is converted into a sample voltage. In such embodiments, when the sample voltage meets or exceeds the voltage threshold, the control circuitry then causes the AOM to activate the second light source to transmit light onto the location in the sample that contains the molecule. In such embodiments, when the sample voltage does not meet or exceed the voltage threshold, the control circuitry then causes the AOM to turn-off the second light source and no light is transmitted onto the location in the sample as that location does not contains the molecule.

The invention allow provides embodiments that utilize two thresholds, and digital logic conditions. For example, signals can come from two separate detectors and satisfy a defined logic combination to active the second light source.

BRIEF DESCRIPTION OF THE DRAWINGS

FIG. 1A shows an illustration of the RPOC concept. The excitation laser beam(s) is raster-scanned across the field of view. If the optical signal (fluorescence/Raman/etc.) is detected at certain pixels and satisfied a selection condition, the signal will trigger an AOM to turn on a second laser beam to interact only at the same pixel. If no signal is detected or the signal does not satisfy the selection condition, the interaction laser beam is turned off. FIG. 1B shows the illustration of RPOC for selective control of molecular activities in a cell during laser scanning. FIG. 1C shows schematic of the RPOC experimental setup. HWP, half-wave plate; L, lens; M, mirror; DBS, dichroic beam splitter; PBS, polarization beam splitter; AOM, acousto-optic modulator. FIG. 1D shows the profile of the control laser beam (at 522 nm) after the AOM when the AOM is turned off. FIG. 1D shows The profile of the control laser beam after the AOM when the AOM is turned on (the 1st order deflection is highlighted). FIG. 1F shows the response time of the comparator box is measured to be ~15 ns.

(FIG. 3A) Illustration of electronics to select an intensity passband for determination of active pixels. (FIG. 3B) The active pixels selected using only one comparator box with $V_T$=0.3V (upper panel), the overlay of the active pixels with the corresponding SRS image from the same field of view (middle panel), and a magnified image from the selected area (bottom panel). (FIG. 3C) Active pixels selected using two comparator boxes with the intensity range between 0.2-0.3V (left panels) and 0.1-0.16V (right panels). (FIG. 3D) Illustration of electronics to choose the AND function for determination of active pixels using two comparator boxes. (FIG. 3E) An SRS image of MIA PaCa-2 cells at the $CH_2$ stretching vibration. (FIG. 3F) An TPEF image of the MIA PaCa-2 cells labeled using ER tracker. (FIG. 3G) An overlay of the TPEF image from ER and the active pixels determined using $V_{T1}$=0.25 V (SRS) and $V_{T2}$=0.25 V (TPEF). (FIG. 3H) An overlay of the TPEF image from ER and the active pixels using $V_{T1}$=0.25 V (SRS) and $V_{T2}$=0.25 V (TPEF). Scale bars: 10 μm in panels B and C upper two rows, 5 μm for the enlarged area in FIGS. 3B and 3C, 10 μm in FIGS. 3E-H, 1 μm for the enlarged area in FIGS. 3G and 3H.

(FIG. 4A) An illustration of switching states of CMTE between the open cis isomer (1*a*) and the closed isomer (1*b*) forms using UV and visible (green) light. (FIG. 4B) An illustration of the workflow for CMTE conversion by the RPOC using 1510 $cm^{-1}$ SRS signal and a 522 nm laser. (FIG. 4C) An SRS image in the $CH_2$ region, at 1510 $cm^{-1}$ before RPOC, the active pixels, at 1510 $cm^{-1}$ after RPOC using $V_T$=0.17 V, the SRS intensity difference before and after RPOC, at 1510 $cm^{-1}$ after the AOM constantly on for 20 frames. (FIG. 4D) Magnified images of the selected areas in FIG. 4C. (FIG. 4E) SRS intensity profiles of images and active pixels long the dotted lines in FIG. 4D. The dashed curve shows the SRS intensity profile along the same line after 20 scan frames with AOM constantly on. (FIG. 4F) Integrated SRS intensity changes of CMTE as a function of the number of active pixels for CMTE aggregates. Open circles are experimental results, the line is the quadratic fitting. (FIG. 4G) Mean SRS intensity changes of CMTE as a function of the number of active pixels for CMTE aggregates. Open circles are experimental results, the line is the linear fitting. Scale bars: 10 μm in C, 5 μm in FIG. 4D.

(FIG. 5A) An SRS image at 1510 $cm^{-1}$ before RPOC (left), active pixels selected by an upper threshold ($V_U$) of 0.4 V and lower threshold ($V_L$) of 0.15 V (middle left), an SRS image at 1510 $cm^{-1}$ after the RPOC (middle right), and the SRS intensity difference before and after the RPOC (right). (FIG. 5B) Magnified images from the highlighted regions in panel A. (FIG. 5C) SRS intensity profiles of images long the dotted lines in FIG. 5B. The dashed curve shows the SRS intensity profile along the same line after 20 scan frames with AOM constantly on. (FIG. 5D) Similar images as in FIG. 5A, using $V_U$=0.12 V and $V_L$=0.10 V for active pixel selection. (FIG. 5E) Magnified images from the selected regions in FIG. 5D. (FIG. 5F) SRS intensity profiles of images long the dotted lines in FIG. 5E. The dashed curve shows the SRS intensity profile along the same line after 20 scan frames with AOM constantly on. The middle panel plots SRS intensity difference before and after RPOC. Scale bars: 10 μm for FIGS. 5A and 5D, and 5 μm for FIGS. 5B and 5E.

(FIG. 6A)

Images showing active pixels, SRS signals from CMTE at 1510 $cm^{-1}$, overlay of CMTE signals and ER tracker fluorescence signals, and the CMTE SRS signal changes after RPOC manipulation of CMTE accumulations in LDs only on ER. (FIG. 6B) Magnified images from the highlighted areas in FIG. 6A. (FIG. 6C) CMTE SRS intensity profiles along the selected lines in FIG. 6B. (FIG. 6D) Intensity profiles of active pixels. Colored bars highlight labeled LDs. Scale bars: 10 μm in FIG. 6A and 5 μm in FIG. 6B.

FIG. 8 panel B shows the SRS intensity profile along the dashed line in panel A. The Gaussian fit quantifies the width of the object, which demonstrates a 373 nm spatial resolution. Scale bar: 10 μm.

FIG. 9 panel B shows fluorescence signals from green fluorescent beads excited by the TPEF from 1045 nm excitation laser beam. FIG. 9 panel C shows an overlay of images in panels A and B, showing an offset due to the misaligned excitation and RPOC laser beams. FIG. 9 panels D-F show similar images as shown in panels A-C, after optimization of beam overlapping, showing no image offsets in Panel F. FIG. 9 panel G shows single- and two-photon intensity profiles along the lines in panels D and E. The curves are Gaussian fitting results, showing a peak center offset of ~90 nm. Scale bars: 5 μm.

FIG. 14 panel B shows a TPEF image from the 450/106 nm channel of the same field of view of the panel A. FIG. 14 panel C shows merging the SRS and TPEF images from panels A and B. (H) Active pixels determined by the SRS signals. FIG. 14 panel D shows active pixels determined by the TPEF signals. FIG. 14 panel E shows active pixels determined by the SRS AND TPEF pixels. Scale bars: 10 μm.

DETAILED DESCRIPTION

Precision control of molecular activities and chemical reactions in live cells is a long-sought capability by life scientists. No existing technology can probe molecular targets in cells and simultaneously control the activities of only these targets at high spatial precision and on the fly. We develop a real-time precision opto-control (RPOC) technology that detects a chemical-specific optical response from molecular targets during laser scanning and uses the optical signal to trigger an acousto-optic modulator, which allows a separate laser beam to only interact with the molecules of interest without interacting with other parts of the sample. RPOC allows automatically probing and controlling biomolecular activities and chemical processes in dynamic living samples with submicron spatial accuracy, nanosecond response time, and high chemical specificity.

The RPOC Platform

Figure 1A:
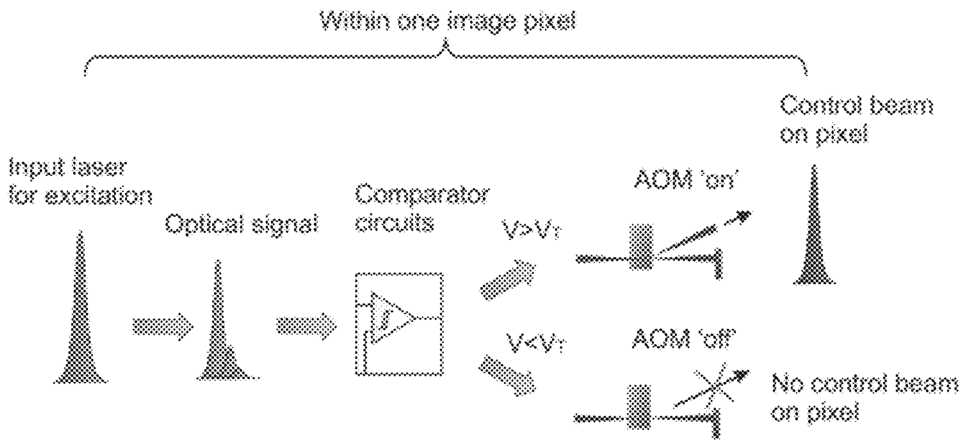
FIGS. 1A-F show the RPOC concept and optical configuration.
Figure 1B:
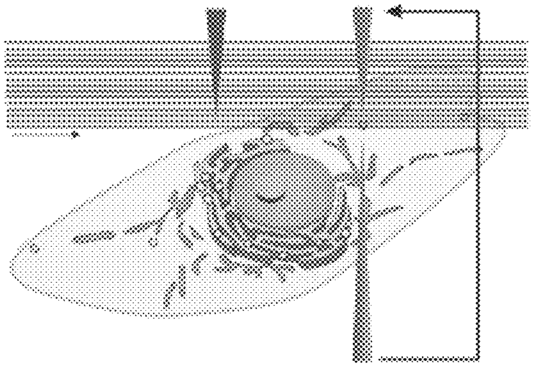
Figure 1C:
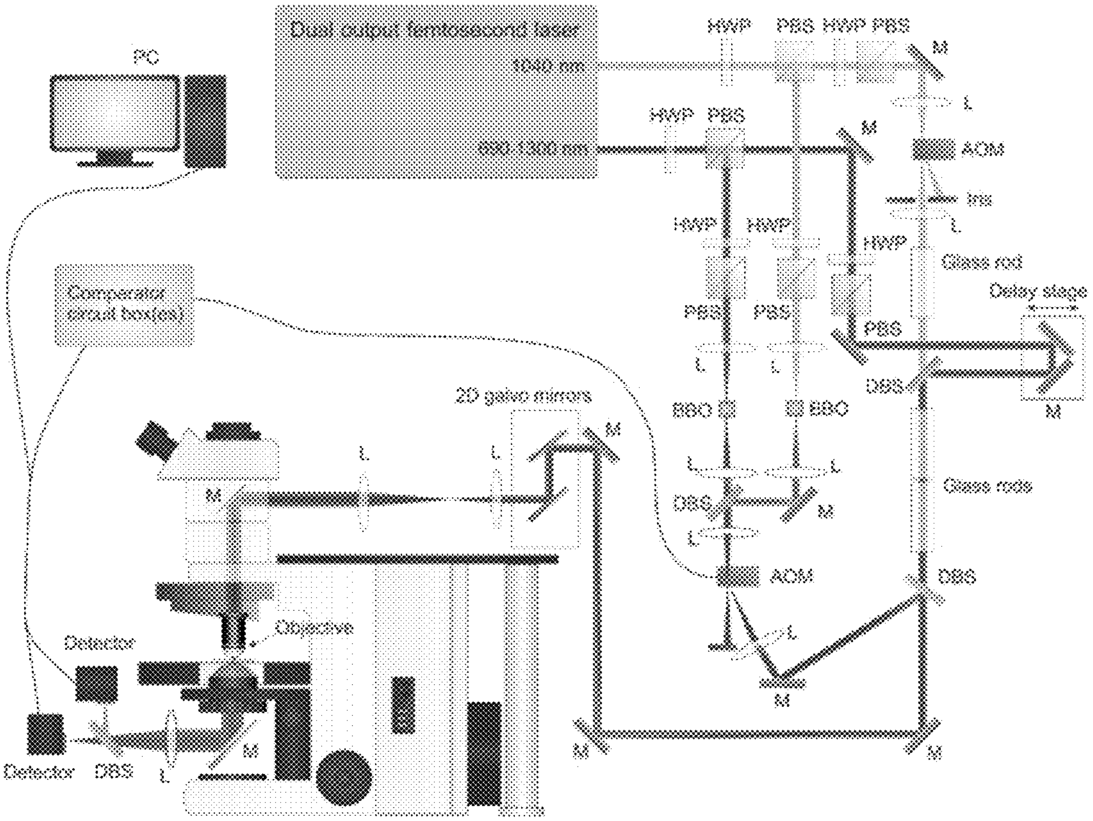
Figure 1D:
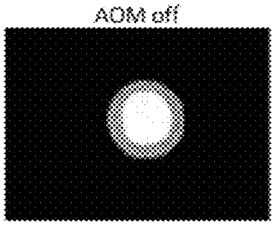
Figure 1E:
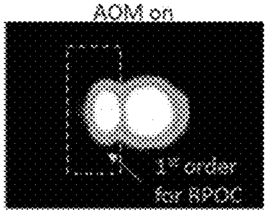
Figure 1F:
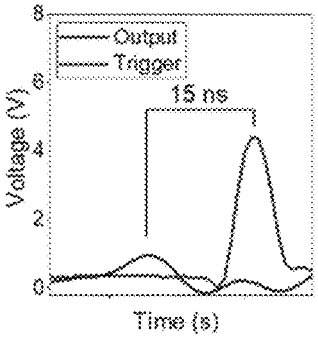

The concept of RPOC, which is based on fast laser scanning, is illustrated in FIGS. 1A and B. A laser(s) for optical signal excitation is scanning through the field of view. During the laser scanning, if a chemical-specific optical signal is detected and satisfies a preset condition (e.g. surpasses a threshold value), it will trigger an AOM to send a separate laser beam to interact with the sample at the same pixel in real-time. Optical signals that do not satisfy this condition will "turn off" the control laser beam to avoid laser interaction. Digital comparator circuits (fig. S1) were designed for presetting the selection conditions (e.g. the threshold $V_T$), performing analog/digital comparisons, and sending out a standard transistor-transistor logic (TTL) voltage for AOM control. Three operation modes of this circuit box include: AOM constantly on, AOM constantly off, and AOM control triggered by the signal-threshold comparison. The voltage threshold can be preset by manual analog tuning or digital signal input with a range of 0-10V and 0.01V accuracy. A schematic of the RPOC system is shown in FIG. 1C. A dual-output femtosecond laser was used to perform optical signal excitation and opto-control. The 1045 nm laser output was used as the Stokes beam and the frequency-tunable laser output was used as the pump beam for stimulated Raman scattering (SRS) signal generation (18, 19). The laser beams were also used for two-photon excitation fluorescence (TPEF) signal excitation (20). Portions of both outputs were frequency-doubled by barium borate (BBO) crystals to the visible range for opto-control. Flip mirrors were used to select the desired control laser wavelength. The selected control laser was sent to an AOM and commanded by the comparator circuits. The laser beam profiles after the AOM using '0' and '1' TTL commands are shown in FIGS. 1D and 1E, respectively. The 0th order output was blocked by a beam stop and the 1st order of the AOM output was combined with the excitation IR laser beams by a dichroic mirror before coupling into the microscope. A photomultiplier tube (PMT) and a lab-designed amplified photodiode were used to acquire fluorescence and SRS signals, respectively. FIG. 1F shows the ~15 ns time response of the comparator circuits. The AOM response time (see Supplementary information) is calculated to be ~7 ns. Therefore, the response time of the opto-control system is <30 ns, much shorter than the 10 μs pixel dwell time for laser scanning. More details of the RPOC platform can be found in the Supplementary Information, Methods and Materials.

Figure 8:
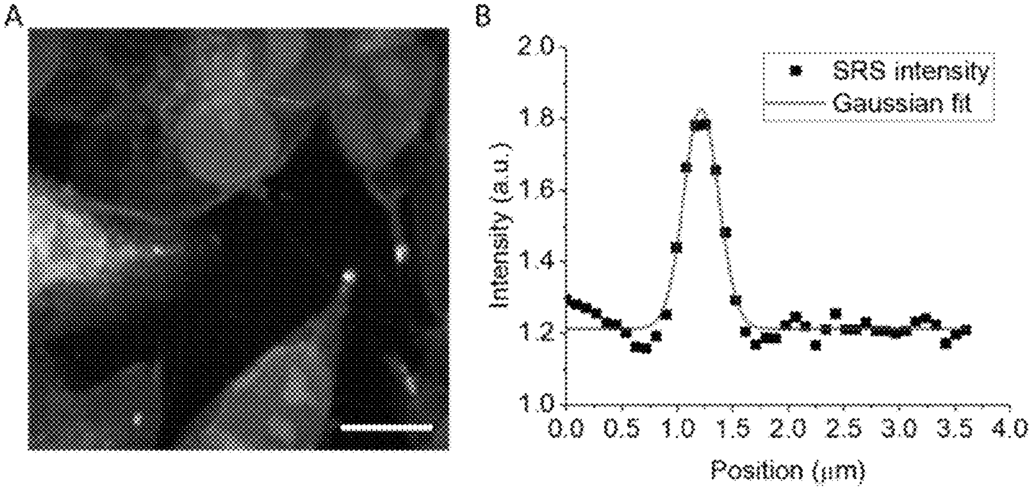
FIG. 8 panel A shows an SRS image of MIA PaCa 2 cells at the 2855 $cm^{-1}$ Raman shift.
Figure 9:
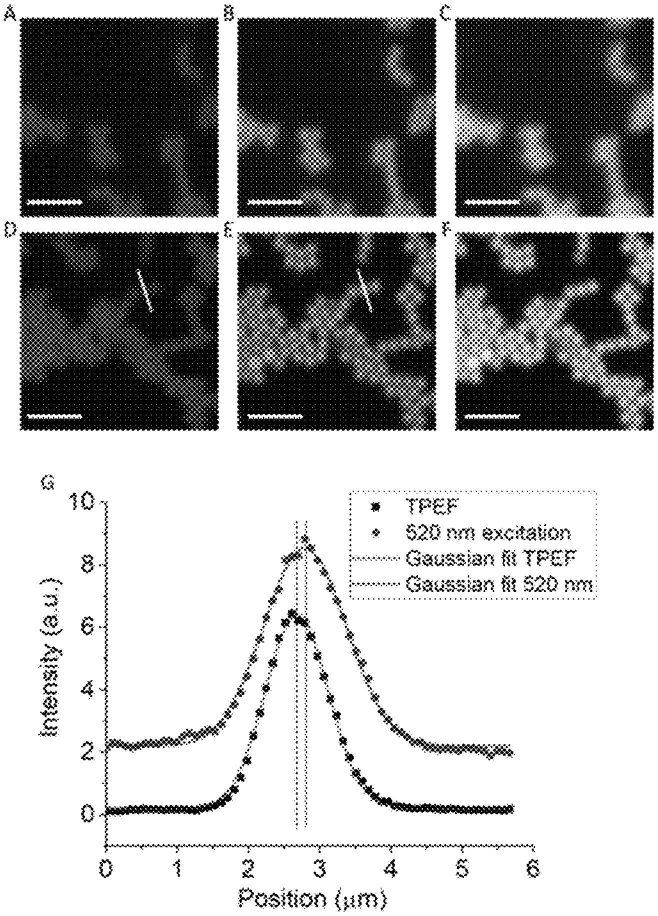
FIG. 9 panel A shows fluorescence signals from green fluorescent beads excited by the 522 nm RPOC laser beam.

An SRS image of MIA PaCa2 cells is shown in FIG. 8 panel A, in which a small cellular feature was used to determine the spatial resolution of the imaging system. A Gaussian intensity profile fitting (FIG. 8 panel B) gives the resolution of 373 nm for the SRS, and we assume a similar resolution for the TPEF modality. Spatial overlapping of the excitation and RPOC laser beams is critical to ensure accurate molecular control. Under the misaligned condition, as shown in FIG. 9 panels A-C, fluorescence microparticles (1 μm) imaged using excitation and the RPOC laser beams show an image offset, which can be minimized after laser alignment optimization (FIG. 9 panels D-F). Gaussian fitting of the intensity profiles from the same microparticle in two images gives a peak center difference within 90 nm. The peak width fitting measures the size of the ROPC laser beam (center frequency at 522 nm) to be ~525 nm at the focus. This beam size is bigger than the theoretical minimum using a NA=1.2 objective lens, majorly due to the reduced beam size of the 1st order AOM diffraction as shown in FIG. 1E.

Real-Time Control of Active Pixels Using Chemical-Specific Optical Signals

Figure 2A:
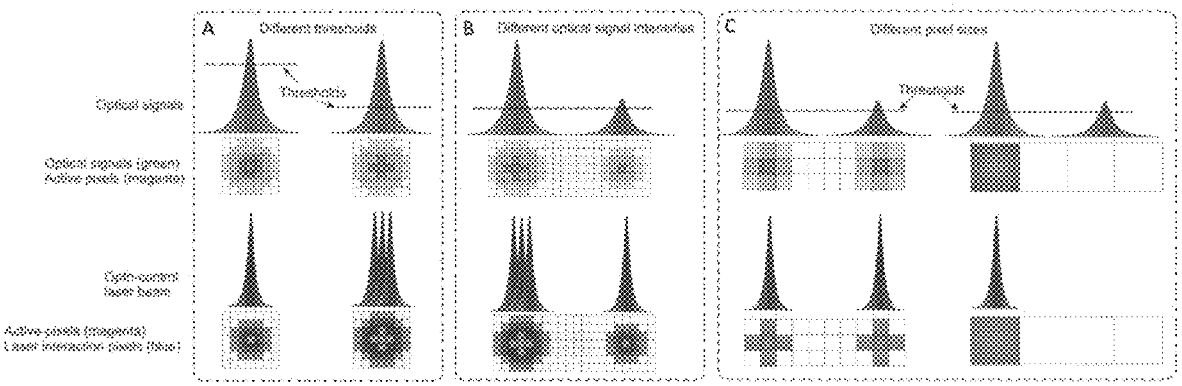
FIGS. 2A-C show mapping out RPOC active pixels. (Panel A) An illustration of active pixel selection using different signal thresholds in the over-sampling condition. The green pulses and pixels indicate optical signals, the magenta pixels indicate active pixels, and the blue pulses and pixels indicate the interaction pulses and pixels. (Panel B) An illustration of active pixel selection using different optical intensities in the over-sampling condition. (Panel C) An illustration of active pixel selection at larger pixel sizes for different optical signals. (Panel D) Mixed fluorescence beads detected in the 570/60 nm channel (left, both orange and green fluorescent beads) and 450/106 nm channel (right, only the green fluorescent beads). (Panel E) Active pixels determined using 0.5 V (left), 0.7 V (middle), and 1.2 V (right) voltage as thresholds for the signals from the 450/106 nm channel. The right panel is the optimal voltage threshold to only turn on the control laser at the pixels of green beads. (Panel F) Comparing the 450/106 nm channel optical intensity when the RPOC is turned on (red) and off (green). A small portion of the control laser beam is leaking into the PMT and added on top of the fluorescence signals. (G) A pseudo-color SRS image containing PMMA (red) and PS (green) beads. (Panel H) Active pixels determined using the PS peak at 2950 $cm^{-1}$ (left), PMMA peak at 3060 $cm^{-1}$ (right), and no Raman peaks at 2990 cm' (middle). (Panel I) SRS spectra of PMMA (red) and PS (green). The red, green, and blue lines are wavenumbers used for RPOC in panel H. (Panel J) An SRS image of MIA PaCa-2 cells in the lipid $CH_2$ stretching region. (Panel K) Active pixels determined using SRS signals from lipid droplets. (Panel L) An overlay of the SRS image and the active pixels turned on only at the lipid droplets. (Panel M) Time-lapse SRS images of a lipid droplet in a live MIA PaCa-2 cell (top row) and the corresponding active pixels determined by the SRS signals (bottom row). The color curves plot trajectories of the lipid droplet and the active pixels in 200 s. Scale bars: 10 μm for Panels D, E, J, K, L, 5 μm for panels G and H, and 1 μm for M.
Figure 2B:
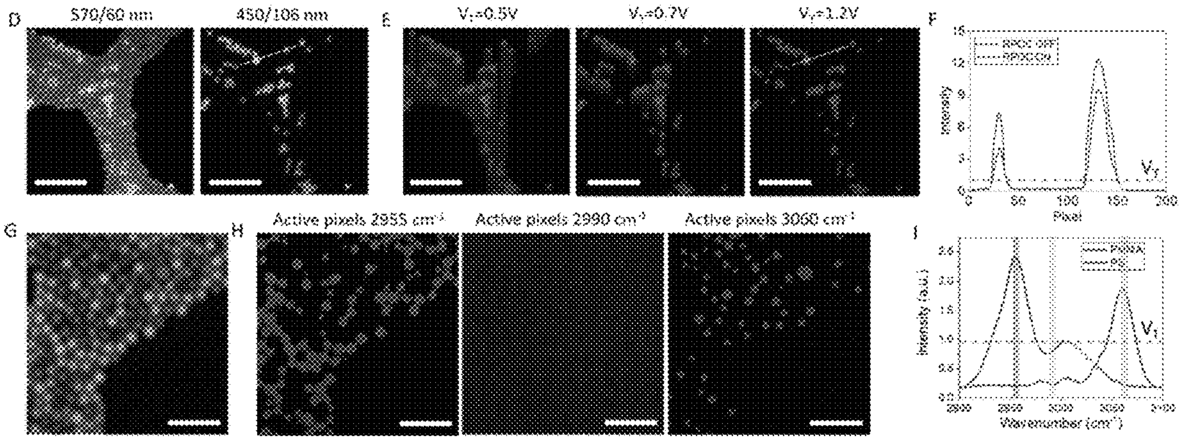
Figure 2C:
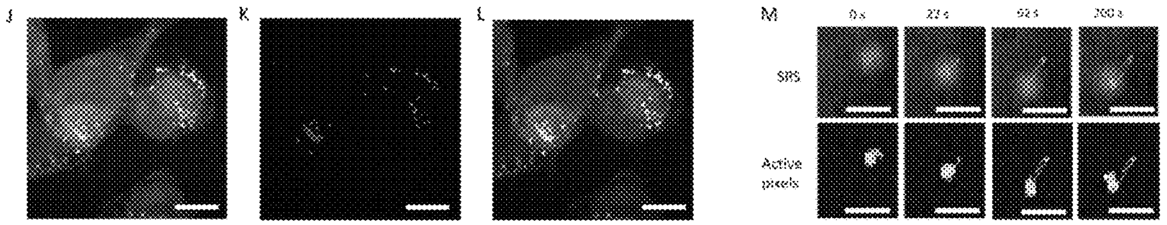

An 'active pixel' is defined as the pixel location at which the control laser beam is turned on. Tracking active pixels is critical for visualizing the opto-control locations. FIGS. 2A-C illustrate the determination of active pixels and the actual laser interacting pixels at different thresholds, optical signal intensities, and pixel sizes. In the over-sampling condition (the pixel size is smaller than the laser beam size at the focus), the size of the laser interaction area is larger than the size of the active pixels (FIG. 2A panel A). Higher intensity thresholds reduce active pixels and laser interacting areas. Similarly, at the same intensity threshold, weaker optical signals above the threshold reduce active pixels and the laser interaction area (FIG. 2A panel B). Increasing the pixel size might change these properties. Different optical signal intensities that would result in different active pixels in the oversampling condition might give the same active pixels and interaction areas (FIG. 2A panel C). When the pixel size is greater than the actual laser beam size, the active pixels might be the same or even larger than the actual interaction area (FIG. 2A panel C). In this work, we use the oversampling condition for all active pixel determination and opto-control. We use the PMT to track the 'active pixels' in real-time.

We first use fluorescence signals from mixed fluorescent beads to demonstrate the determination of active pixels. A mixture of green and orange fluorescent beads is sandwiched between glass coverslips for imaging. We utilize 800 nm laser pulses to excite the TPEF signals of these beads. FIG. 2B panel D shows fluorescence signals detected in the 570/60 nm fluorescence channel from both green and orange fluorescent beads (left panel) and the 450/106 nm fluorescence channel from only the green fluorescent beads (right panel). We use the 450/106 nm fluorescence channel paired with a single comparator circuit box to determine the active pixels. The selection condition is the fluorescence signal above a preset threshold $V_T$. As shown in FIG. 2B panel E, when the $V_T$ is low (0.5V), active pixels span from the green to the orange beads. This is because the control laser beam at 400 nm generates additional fluorescence signals from the orange beads that add to the 450/106 nm channel. The initiation of the active pixels along each scanning line requires strong fluorescence signals from a green bead. When the $V_T$ is higher (0.7 V), the number of active pixels outside the green fluorescent beads is reduced. At the $V_T$=1.2 V, the active pixels perfectly match the green beads in the fluorescence channel. FIG. 2B panel F compares the intensity profiles at selected lines in FIG. 2A panels A and B when RPOC is turned off and on. The intensity increase is contributed by the control laser which is only turned on by the fluorescence signal from the green beads.

FIG. 2B panel G shows chemical maps of mixed PMMA (red) and PS (green) beads generated by hyperspectral SRS microscopy (21). Using Raman shifts at 2955 $cm^{-1}$ or 3060 $cm^{-1}$, we can determine active pixels using either PMMA or PS SRS signals, as shown in FIG. 2B panel H. The selection condition is optical signals greater than $V_T$. FIG. 2B panel I displays the SRS spectra of PMMA and PS, the $V_T$, and the selected Raman shifts for active pixel determination in FIG. 2B panel E. Real-time active pixel determination by tuning laser frequencies to match different Raman transitions was achieved. These results demonstrate the control of the active pixels based on different chemical signatures from the sample.

Using the lipid $CH_2$ symmetric stretching SRS signals at 2855 $cm^{-1}$, we can select active pixels only at the lipid droplets (LDs) in cells, as shown in FIG. 2C panel J-L. The active pixels are automatically selected in real-time in live cells. Side-by-side time-lapse images of SRS and active pixel selection using the lipid signals was achieved. The trajectory of active pixels triggered by a single lipid droplet matches the corresponding lipid droplet trajectory (FIG. 2C panel M). We also demonstrate 3D precision controlling of the active pixels in MIA PaCa-2 cells. These results highlight the capability of tracing intercellular dynamics for active pixel determination using RPOC.

Digital Logic Control of Active Pixels

Figure 10:
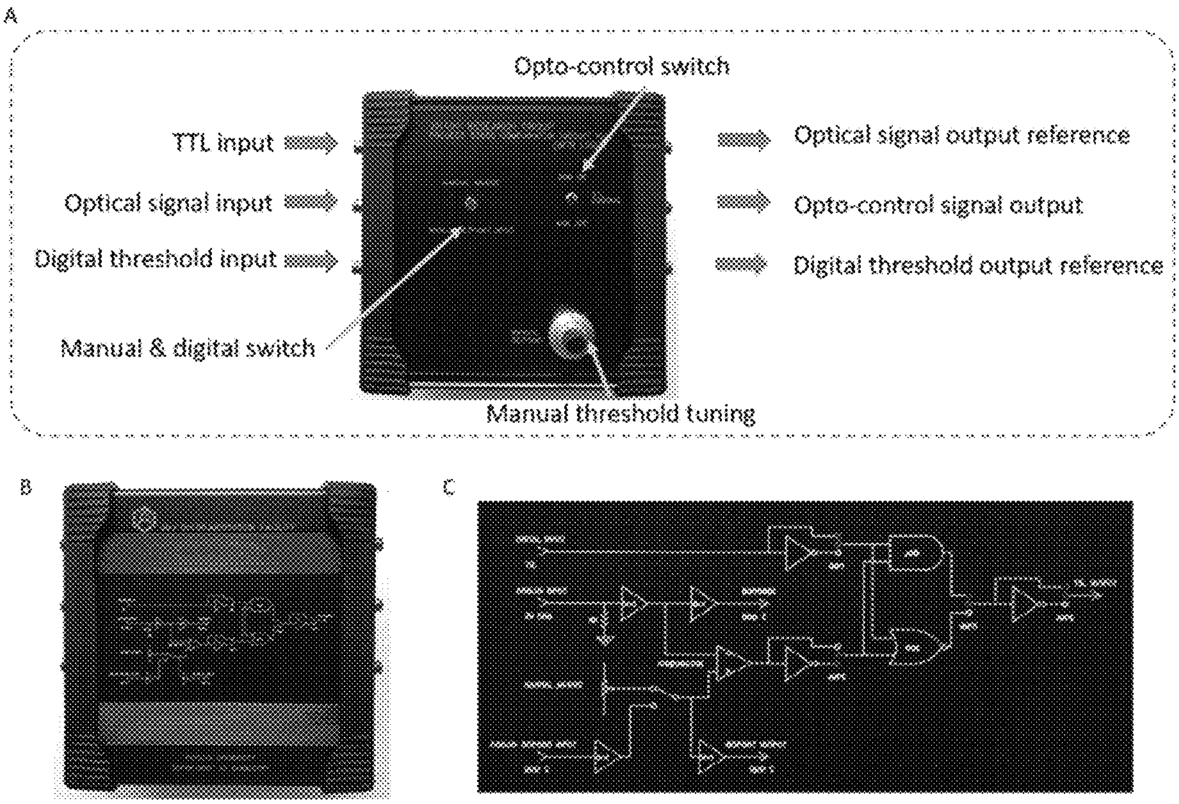
FIG. 10 panels A-C show the design of the comparator circuit box 2 with digital logic functions. (Panel A) The front of the comparator circuit box with explanations of ports and controls. (Panel B) The back of the comparator circuit box. (Panel C) The electronic configuration of the comparator circuit box.

We demonstrated using a single detector and intensity threshold to determine active pixels in RPOC. To further extend the active pixel selection capability and achieve 'smart' RPOC, we built a second comparator circuit box (comparator box 2) with digital logic functionality. Pairing with the other comparator circuit box (comparator box 1), this new design allows to determine active pixels using any intensity range from a single detector or based on logic combinations of two detectors. The design and layout of the digital logic comparator circuit box are shown in FIG. 10 panels A-C. The TTL opto-control signal output from comparator box 1 can be used as the TTL input for comparator box 2. Aside from the same signal comparing circuits, digital logic functions including inverters, an AND gate, and an OR gate are integrated. Using different combinations, digital logic functions can be selected from AND, OR, NAND, and NOR.

Figure 3A:
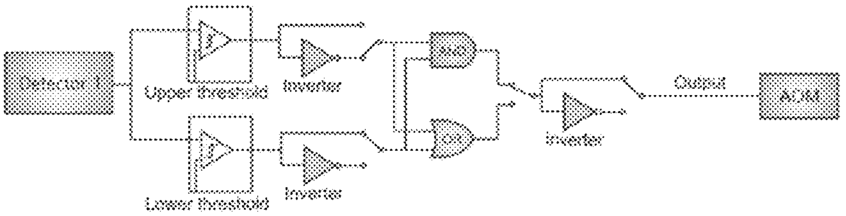
FIGS. 3A-H show digital logic control of active pixels.
Figure 3B:
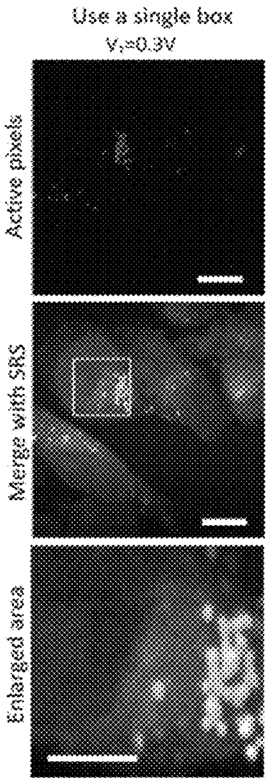
Figure 3C:
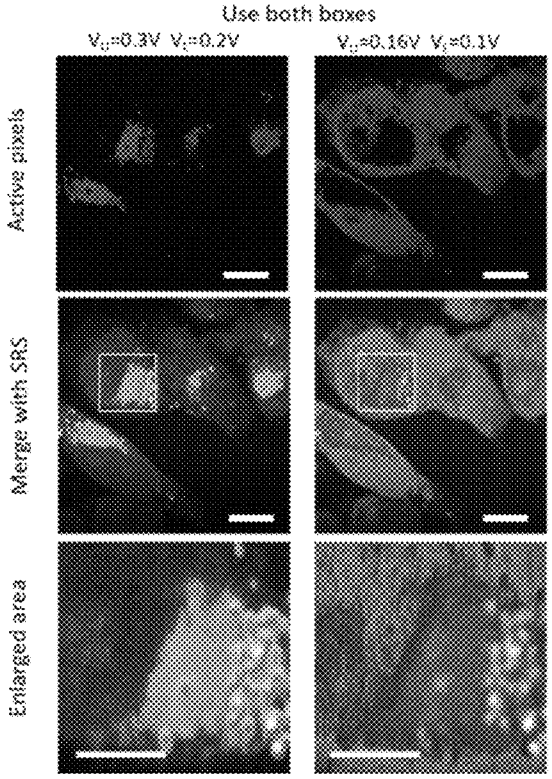
Figure 11:
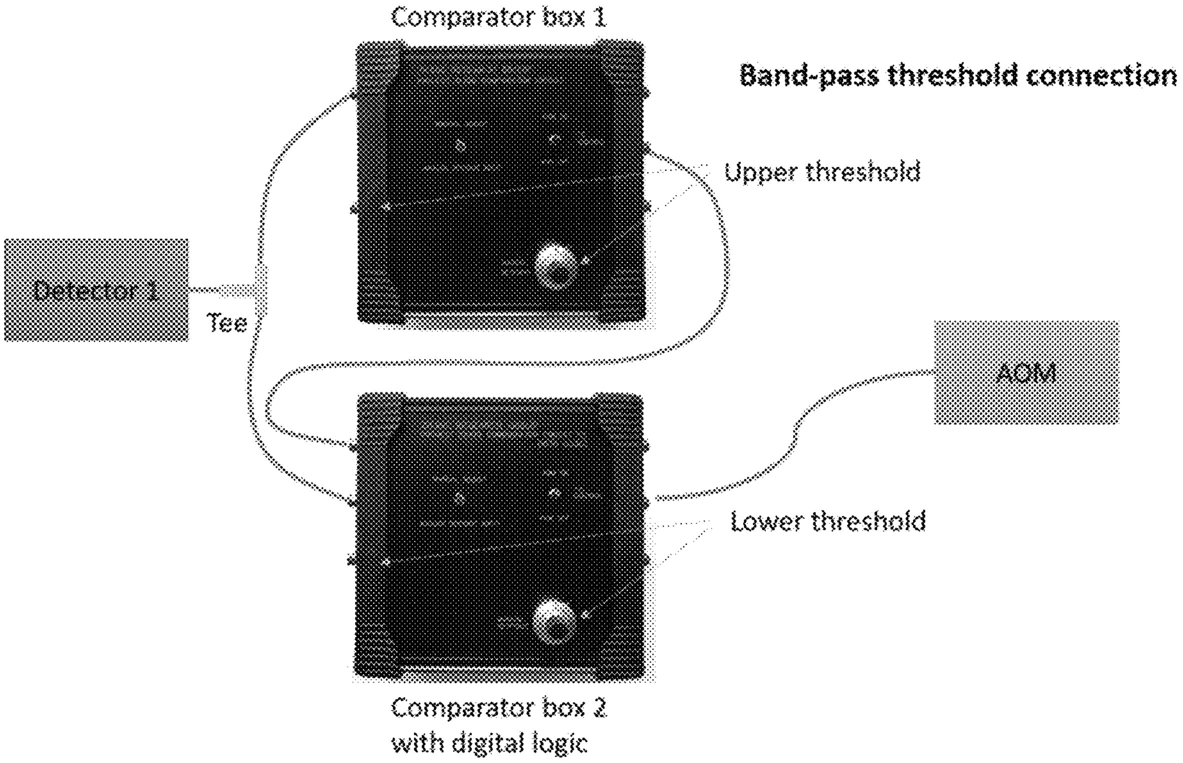
FIG. 11 shows connections of the two comparator boxes to achieve a band-pass threshold for active pixel selection.
Figure 12:
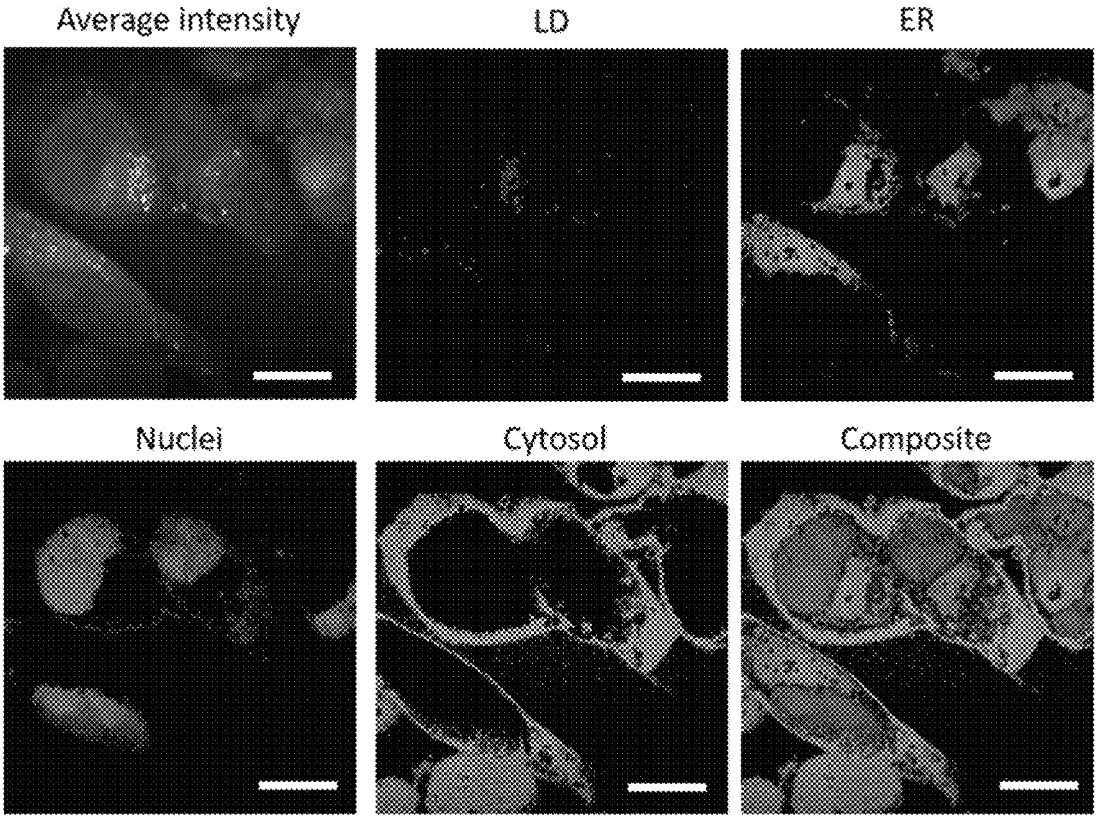
FIG. 12 shows an SRS image (top left) and the chemical maps showing lipid droplets (LDs), endoplasmic reticulum (ER), nuclei, cytosol, and the composite using four chemical compositions generated by spectral phasor analysis of the hyperspectral SRS images. Scale bars: 10 μm.

Using the two comparator circuit boxes, we can select any intensity range from a single detector for active pixel determination. The connections to achieve this function are illustrated in FIG. 3A and FIG. 11. The upper and lower thresholds are selected by the comparator box 1 and 2, respectively. FIG. 3B shows active pixels selected on the lipid droplets using only comparator box 1 and a single intensity threshold. FIG. 3C shows active pixels determined using different intensity passbands between the upper and lower thresholds. Using this function, we can selectively interact with pixels at any intensity range from a detection channel. The active pixels selected between $V_T$=0.2-0.3V are more associated with the endoplasmic reticulum (ER) and between 0.1-0.16V are mostly on cytosols. Spectral phasor analyses of hyperspectral SRS images of the same cells, which segment different cellular compartments (22), are shown in FIG. 12 for comparison.

Figure 3D:
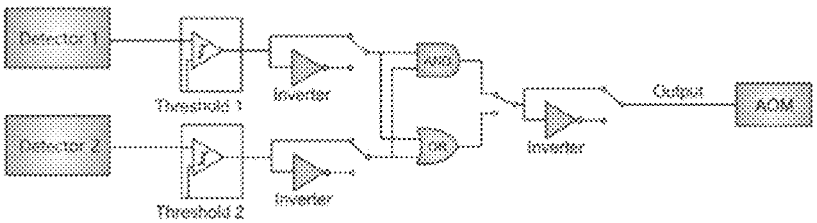
Figure 3E:
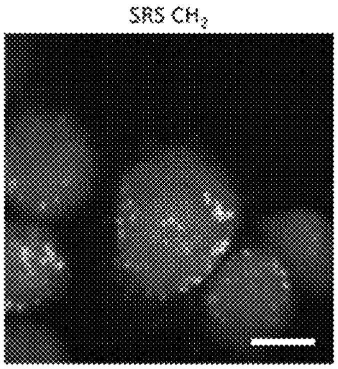
Figure 3F:
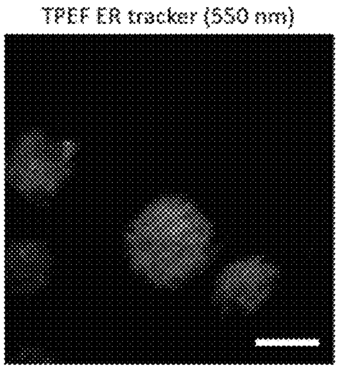
Figure 3G:
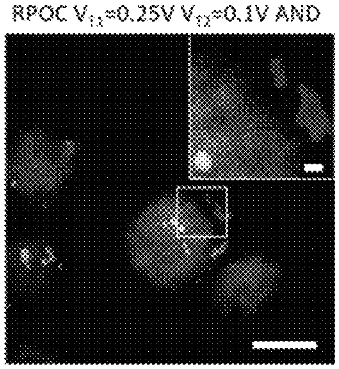
Figure 3H:
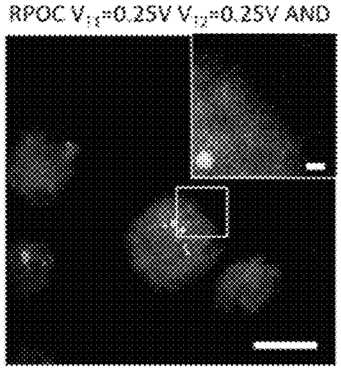
Figure 13:
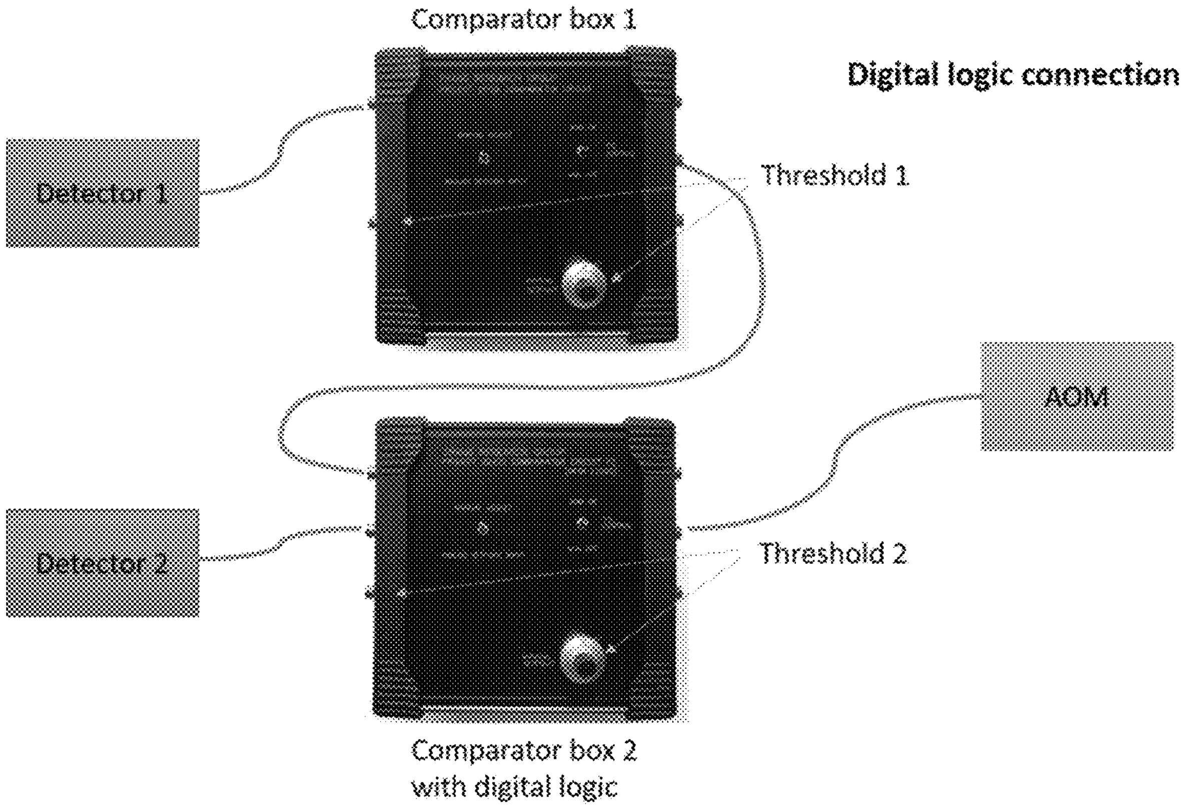
FIG. 13 shows connections of the two comparator boxes to achieve digital logic functions.
Figure 14:
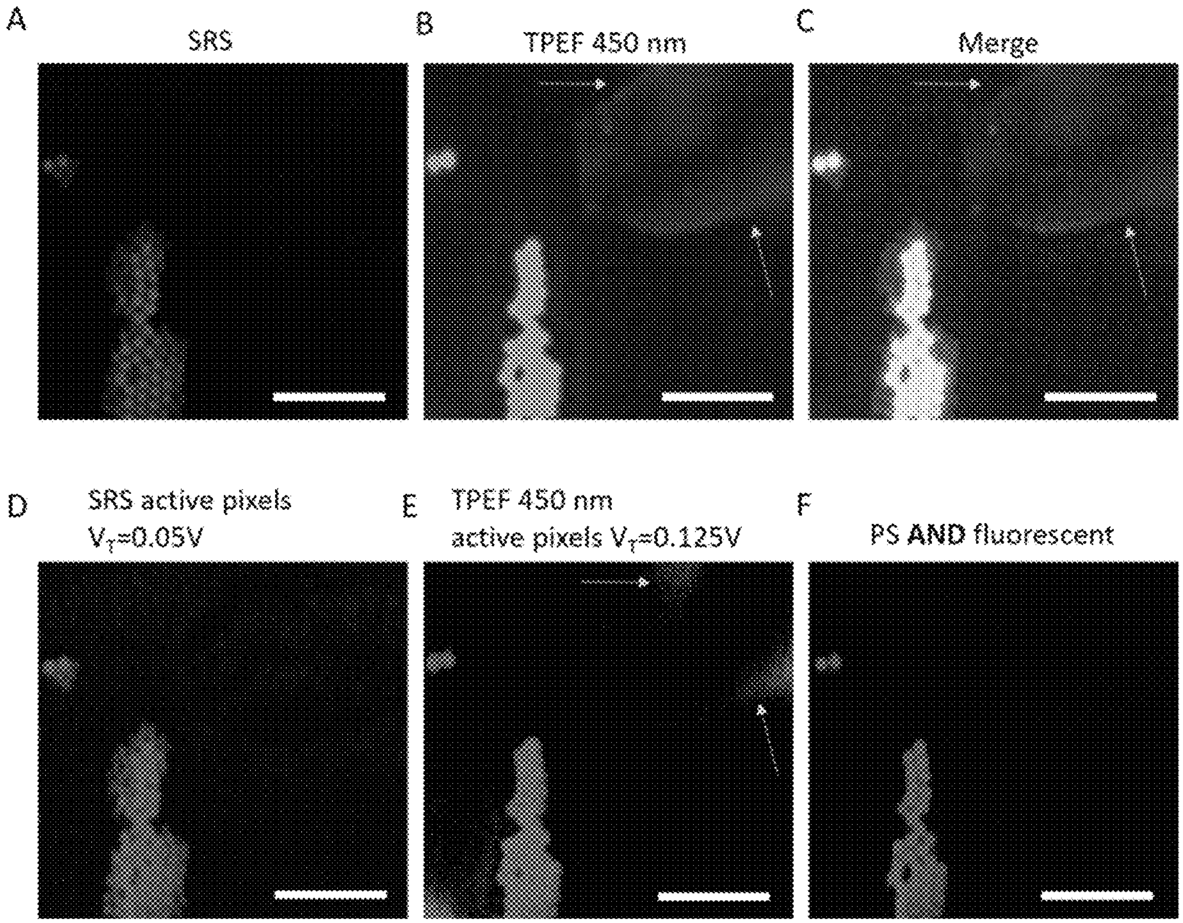
FIG. 14 panel A shows an SRS image of mixed PS beads and NADH crystals at 3060 $cm^{-1}$ Raman shift.
Figure 15:
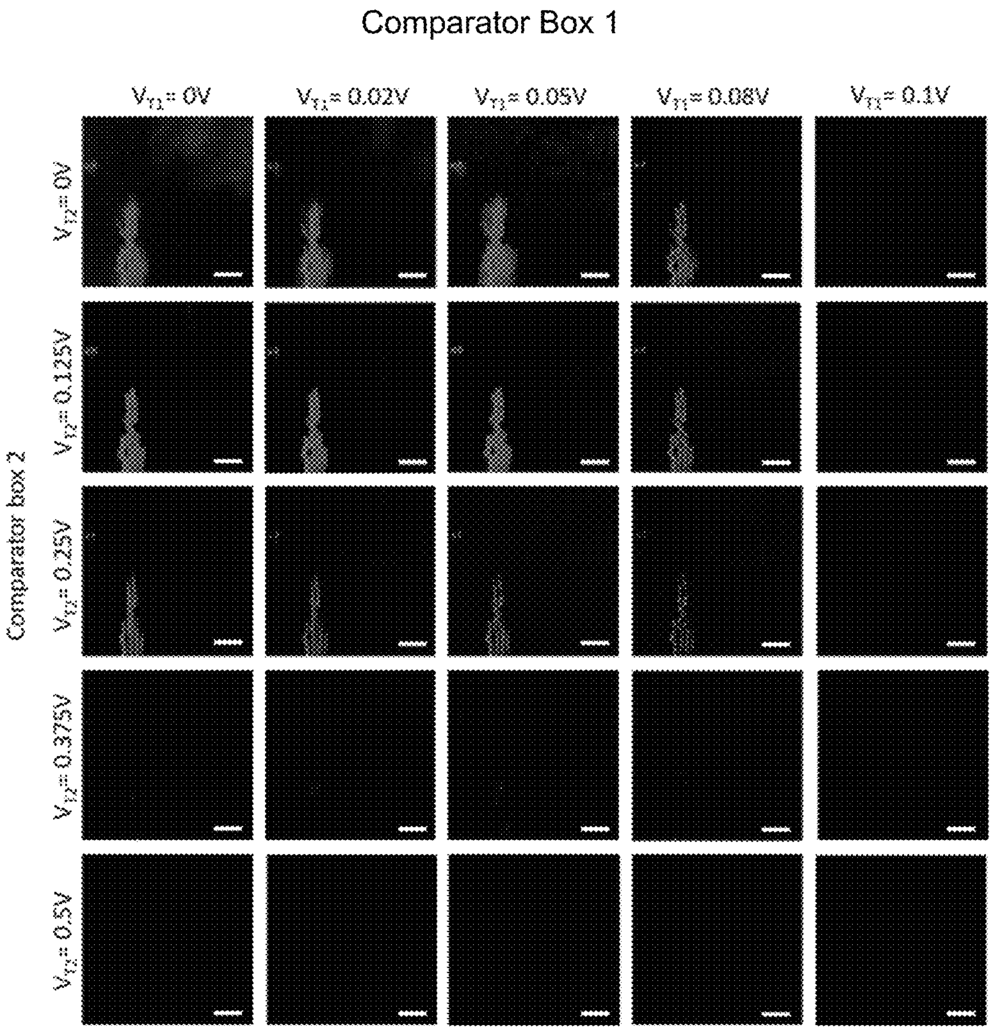
FIG. 15 shows optimizing the selection conditions using the AND digital function and optimizing the voltage threshold values for each comparator box. The magenta signals are active pixels determined in each condition. Scale bar: 5 μm.
Figure 16:
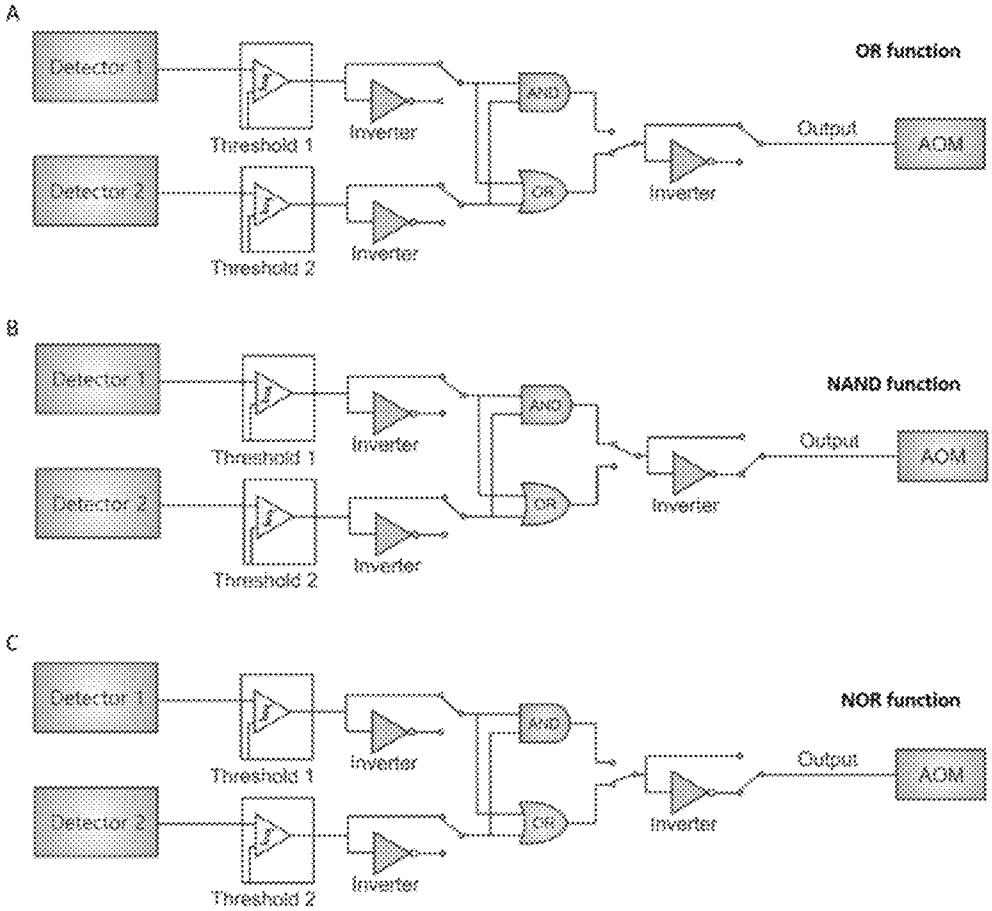
FIG. 16 panels A-C show electronic configurations to achieve the OR, NAND, and NOR logic combinations.

The connections for implementing the digital logic functions using two comparator boxes and two detectors are illustrated in FIG. 13. The selection of the AND function is illustrated in FIG. 3D. We first demonstrate the AND function using mixed fluorescent PS particles, non-fluorescent PS particles, and nicotinamide adenine dinucleotide hydrogen (NADH) crystals, as shown in FIG. 14 panels A-F and FIG. 15. The AND function allows determining active pixels only on the fluorescent PS beads that show up in both TPEF and SRS channels. Next, we used SRS to excite lipid signals (FIG. 3E) in MIA PaCa-2 cells and label the cells using a fluorescent ER tracker which can be visualized in the TPEF channel (FIG. 3F). By using an appropriate $V_{T1}$ in the SRS channel and a low $V_{T2}$ in the TPEF channel, active pixels can be selected from most of the LDs in the cells (FIG. 3G). Increasing the $V_{T2}$ in the TPEF channel can exclude the LDs outside the ER and excite active pixels on LDs only on the ER (FIG. 3H). These results demonstrate using the AND logic from two separate detectors for active pixel determination. The connections of OR, NAND, and NOR functions for RPOC are illustrated in FIG. 16 panels A-C.

Figure 4A:
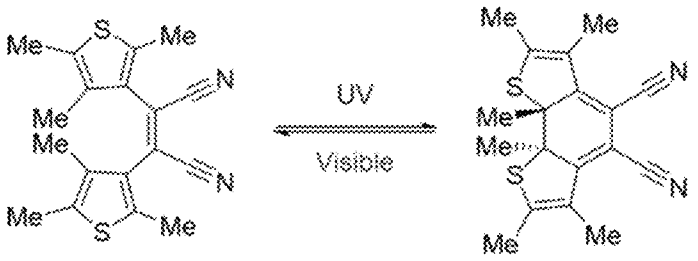
FIGS. 4A-G show precision control and quantitative comparison of site-specific chemical changes using RPOC.
Figure 4B:
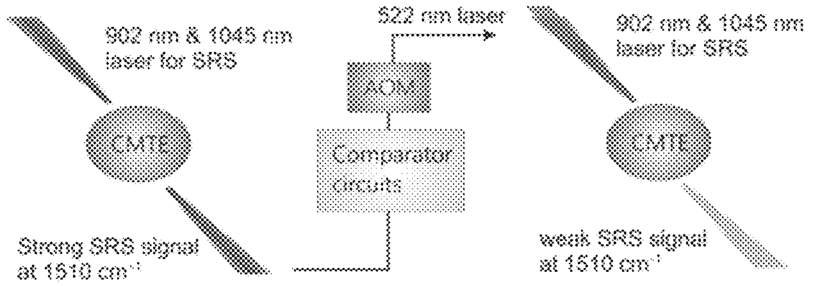

Precision Control and Quantification of Chemical Changes at Sub-Micron Precision To demonstrate precision control of chemical processes using the RPOC, we used a photochromic molecule, cis-1, 2-dicyano1,2-bis(2,4,5-trimethyl-3-thienyl)ethene (CMTE), which can be changed from its open cis isomer (1*a*) to closed isomer (1*b*) by UV light and switched back by visible light at 520 nm (FIG. 4A) (23, 24). A strong Raman signature peak at 1510 $cm^{-1}$ can be detected for 1*b* but not 1*a* (23). The SRS signal from this peak can be visualized by tuning the pump beam to 902 nm. We found that the combination of the pump and Stokes pulsed lasers for SRS imaging can also transform CMTE to 1*b*. To demonstrate RPOC using this 1510 $cm^{-1}$ Raman transition, we introduce a separate 522 nm laser beam from frequency-doubling of the 1045 nm laser beam to convert 1*b* to 1*a* at selected subcellular locations. The Raman transition at 1510 $cm^{-1}$ is used as the reporter for RPOC-induced 1*b* to 1*a* conversion during laser scanning, as illustrated in FIG. 4B.

Figure 4C:
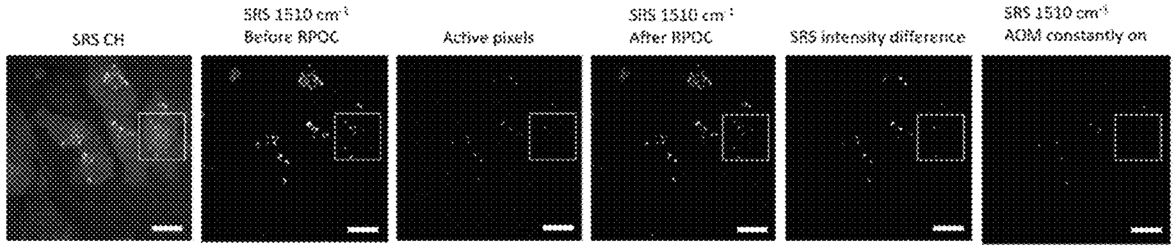
Figure 4D:
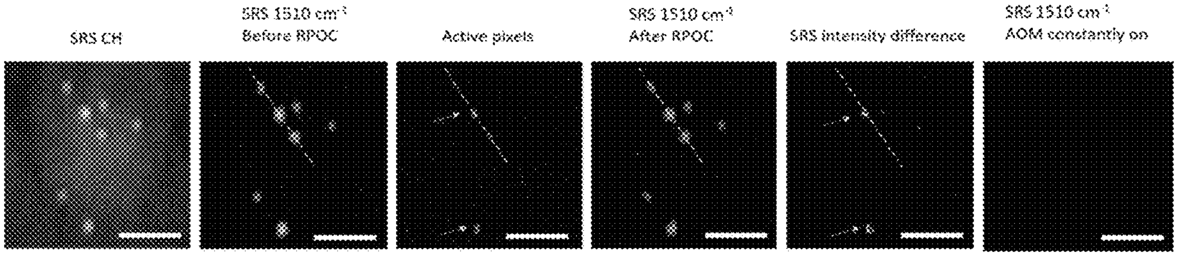
Figure 4E:
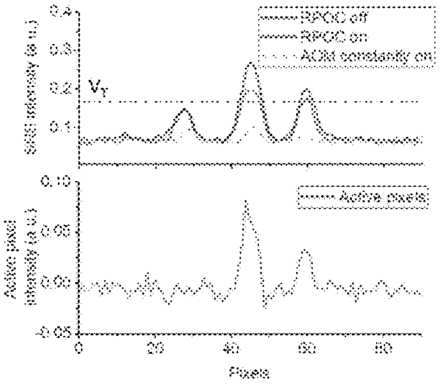
Figure 4F:
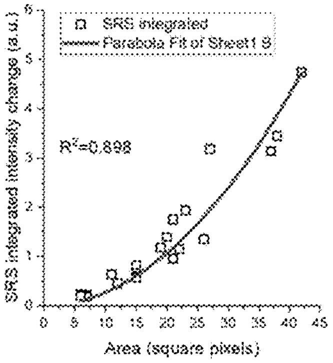
Figure 4G:
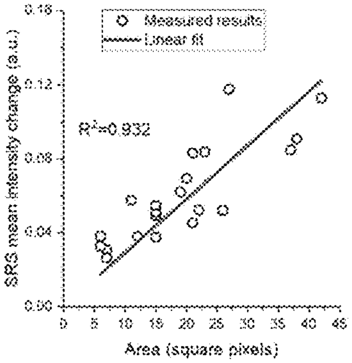

First, we treat MIA PaCa2 cells with CMTE and observed accumulation of CMTE in lipid droplets of the cells due to the hydrophobic structure of the chemical (FIGS. 4C and 4D). Then, we used RPOC to convert 1*b* to 1*a* at selected locations of the sample with a control laser beam power of ~10 μW. A single comparator box with a selection condition of $V_T$>0.17 V was used to determine active pixels which are majorly contributed by high-intensity CMTE aggregates, as shown in FIGS. 4C and 4D. After five frames of RPOC laser scanning, SRS signals at 1510 $cm^{-1}$ from the active-pixel-associated pixels are reduced, which can be visualized from the SRS intensity difference image in FIGS. 4C and 4D. If the control laser beam is constantly turned-on during laser scanning for 20 frames, SRS signals at 1510 $cm^{-1}$ on the entire image are significantly reduced (FIGS. 4C and 4D). The pixels where chemical conversion happened, as shown in the SRS intensity difference images, agree with the active pixels. FIG. 4E plots SRS intensity profiles along the dashed lines in FIG. 4D, for images before and after the RPOC, the active pixels, and after nonselective laser control after 20 frames. We see that laser-induced chemical changes of CMTE only happen at the active pixels. Such chemical changes can be quantified by integrating the SRS intensity change of CMTE on active pixels of each aggregate, which shows a quadratic dependence with the number of active pixels from each aggregate (FIG. 4F). This nonlinear dependence arises from the oversampling condition used for RPOC, as illustrated in FIG. 2A, panel A. The aggregates in the lipid droplets are of a similar size as the laser diffraction limit, Therefore, the laser beam is interacting with every active pixel when is turned on at each active pixel. This gives a quadratic dependence of the amount of chemical changes with the number of active pixels. The mean SRS intensity change, on the other hand, has a near-linear dependence with the number of active pixels (FIG. 4G). These analyses show that RPOC can not only selectively control chemical changes in space but also potentially quantify the amount of products and reaction rates.

Precision Control of Molecular Activities Using Different Selection Conditions

Figure 5A:
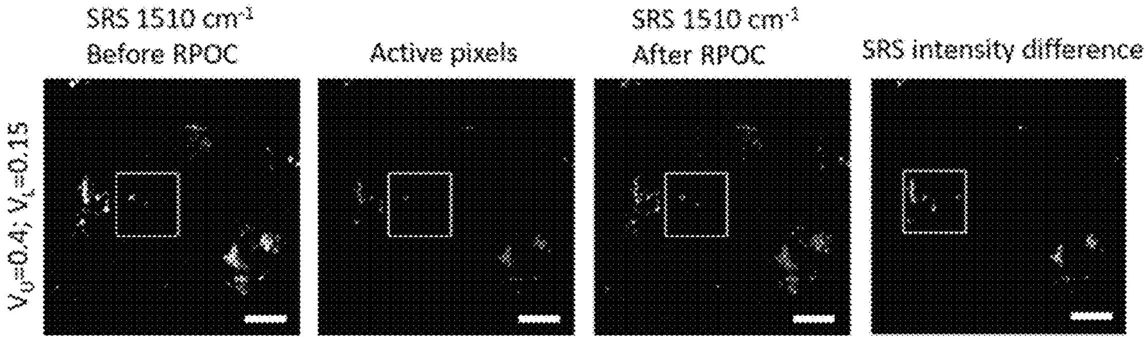
FIGS. 5A-F show precision control of chemical changes by RPOC using different optical intensity ranges.
Figure 5B:
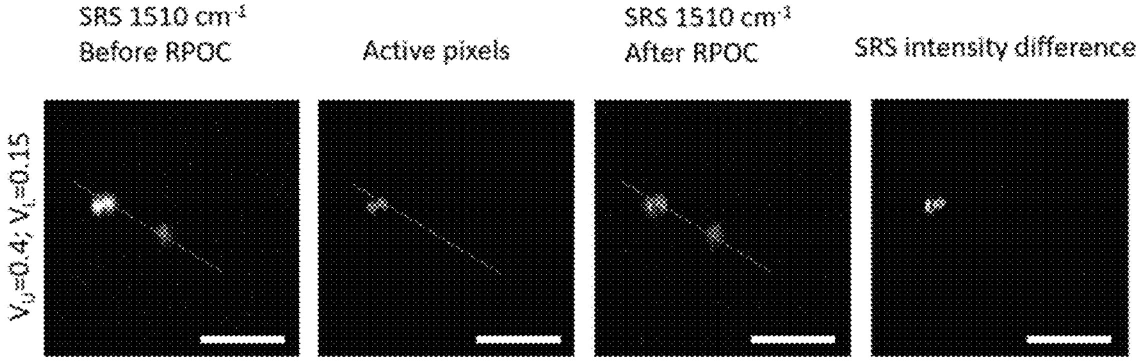
Figure 5C:
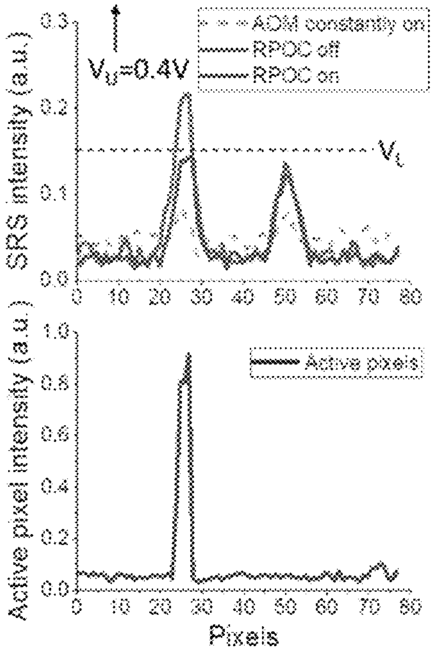
Figure 17:
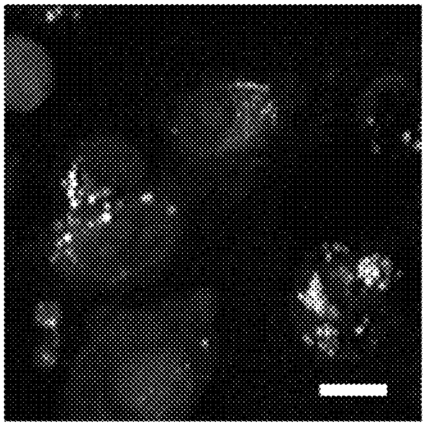
FIG. 17 shows an SRS image of $CH_2$ stretching signals at 2855 $cm^{-1}$ for images in FIG. 5. Scale bar: 10 μm.

Previous results exemplify the RPOC molecular control using a single SRS intensity threshold. Next, we demonstrate using RPOC to control CMTE at different parts of cells using different selection conditions. We first connected two comparator boxes as illustrated in FIG. 9 panels A-G to select an SRS signal range between two intensity levels. Here, the RPOC is only applied for a single-frame laser scanning with 10 μs dwell time per pixel. FIGS. 5A and 5B display the SRS signals from CMTE at 1510 $cm^{-1}$ before the RPOC, the active pixels, after a single frame RPOC, and the SRS intensity changes with a selection condition of $V_L$=0.15V and $V_U$=0.4V, where $V_L$ and $V_U$ are the lower and upper signal limits for RPOC, respectively. The SRS image of $CH_2$ stretching is shown in FIG. 17. Since $V_U$ is very high, this selection range determines the active pixels mostly from the centers of the aggregates that contribute to strong CMTE SRS signals, similar to using a single comparator box as shown in FIGS. 4A-D. The active pixels determined from these high-intensity CMTE aggregates selectively switch the molecules from 1*b* to 1*a* only at these aggregates, not at other lower intensity parts of the cells FIG. 5C.

Figure 5D:
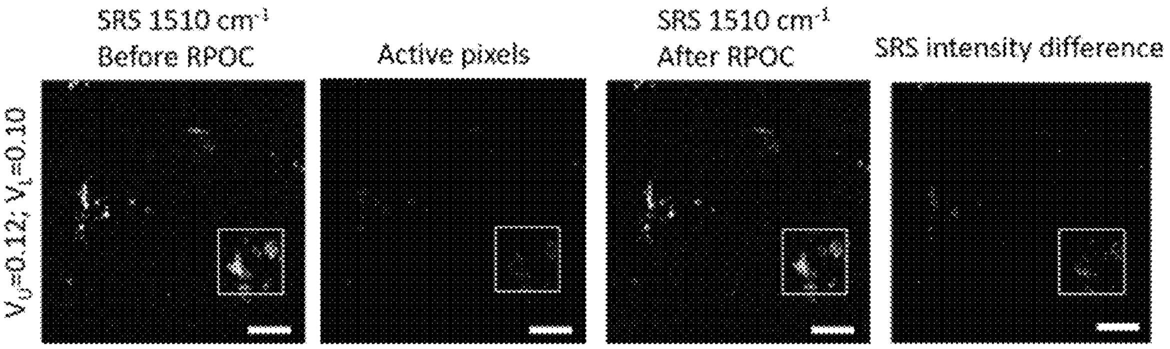
Figure 5E:
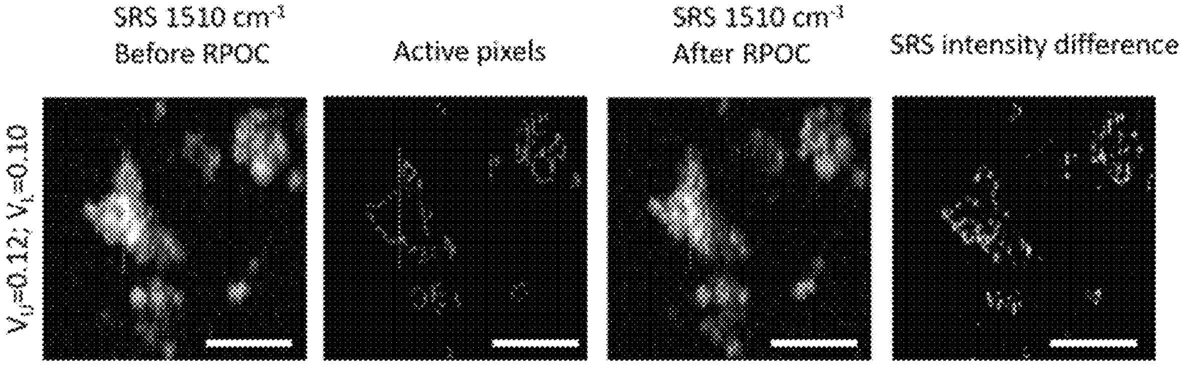
Figure 5F:
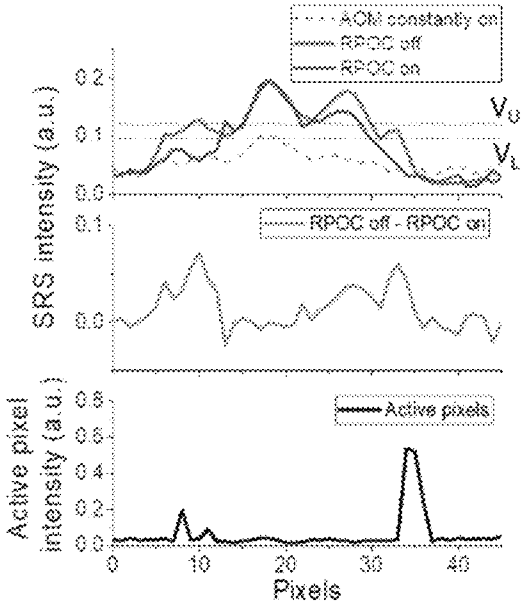

One advantage of using two comparator boxes is being able to select a lower optical signal range for RPOC. As shown in FIGS. 5D and 5E, when the selection condition is chosen as $V_L$=0.10V and $V_U$=0.12V, weaker SRS signals selected active pixels from the edges of most aggregates. In this case, the centers of the aggregates, which are not associated with active pixels, are left unchanged, while the molecules at the edges of the aggregates are converted from 1*b* to 1*a* by RPOC. FIG. 5F plots the SRS intensity change and active pixels along the dotted line and the intensity thresholds. The CMTE transition from 1*b* to 1*a* occurs only at the edges of the aggregates. There are pixels with noticeable SRS signal decrease outside active pixels (FIG. 5F). This is due to the use of an oversampling condition in which the RPOC laser interacting range is larger than the active pixels, as illustrated in FIG. 2A, panel A.

Figure 6A:
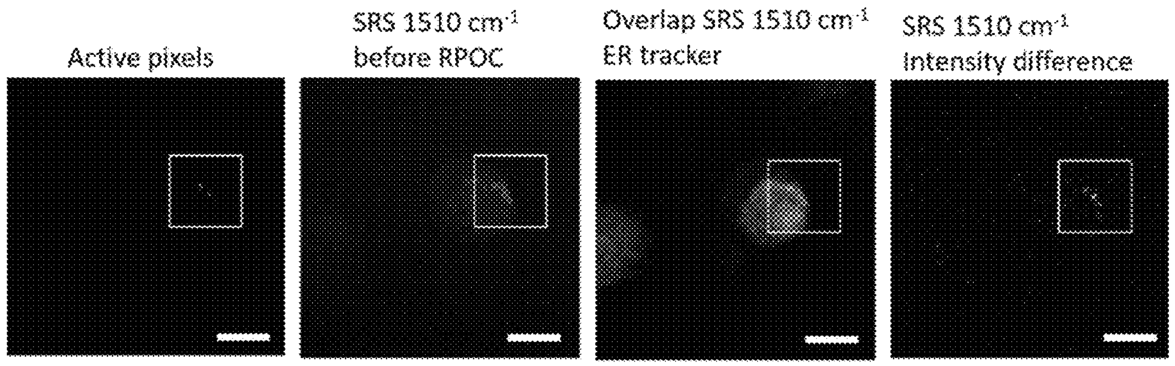
FIGS. 6A-D show precise control of chemical changes by RPOC using digital logic from two detectors.
Figure 6B:
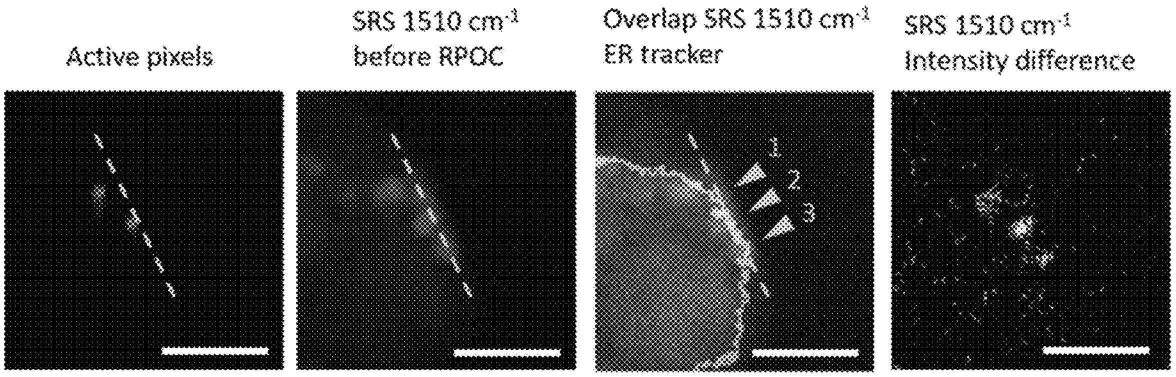
Figure 6C:
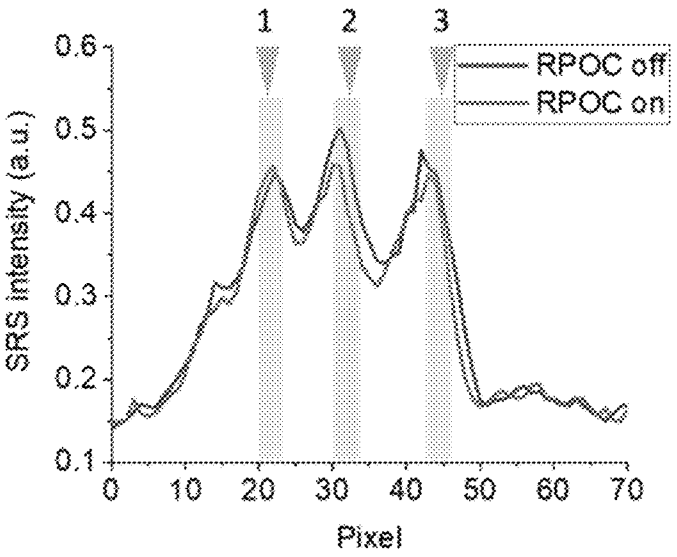
Figure 6D:
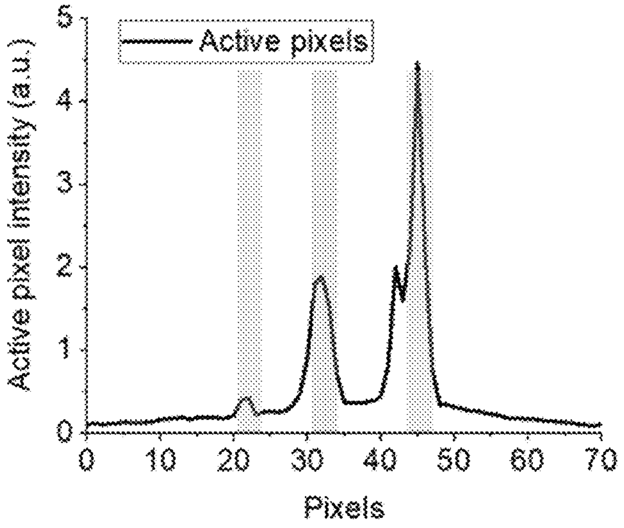

Next, we used ROPC to selectively control the 1*b* to 1*a* conversion accumulated only in ER-associated LDs. SRS was used to detect CMTE targeting the 1510 $cm^{-1}$ peak while ER tracker in the TPEF (550-600 nm) channel was used to delineate ER in live MIA PaCa2 cells. As shown in FIGS. 6A and 6B, active pixels can be determined on ER-associated LDs using SRS and TPEF signals from two detectors with the digital AND function and appropriate threshold levels. The ER boundary is shown in FIG. 6B. By plotting the SRS intensity profiles of three LDs (FIG. 6C) and their corresponding active pixels (FIG. 6D) along the dashed line (FIG. 6B), we can find that LD #1, which is not on ER, although has a similar SRS intensity as the LD #3, is not affected by RPOC; while LDs #2 and #3, both are on ER, are converted from 1*b* to 1*a* by RPOC. These results demonstrate digital logic RPOC can control molecular activities and chemical reactions associated with multiple organelles or related to organelle interactions.

Discussion

We for the first time demonstrate real-time precision opto-control of molecular activities and chemical processes triggered by optical signals from the molecules at submicron spatial precision. RPOC is highly chemical selective since the optical signal can be selected from fluorescence, Raman response, or any other chemical-specific signals generated from the sample. RPOC can perform active control of light-sensitive molecules and chemical reactions in living biological samples due to the fast response and automatic active pixel determination. In this work, we majorly focused on demonstrating the RPOC capability using a photoswitchable molecule CMTE. RPOC can also be applied to control newly developed photochromic vibrational probes (25, 26), widely used photoswitchable fluorescent molecules (27, 28), and light-sensitive chemical reactions (29-32) at high spatial and temporal accuracy.

The continuous improvement of RPOC will lead to more opportunities in biophotonics and biological sciences. For example, further optimization of the control laser beam can improve the RPOC precision. In addition, instead of using an expensive femtosecond laser, a more cost-effective and compact RPOC platform can be developed based on continuous-wave (CW) lasers. This CW-RPOC system would mostly rely on fluorescence signals for active pixel determination but would be more applicable to biological science due to the reduced system cost and better compatibility with commercial fluorescence microscopes. Programmable acousto-optic tunable filters would also allow for the selection of different laser beams automatically for RPOC. Improvement in optics and electronics, such as using an electro-optic modulator and resonant mirrors would further improve the RPOC response time for high-speed laser scanning systems. PROC offers a way for biologists and chemists to control biomolecular behaviors and chemical reactions precisely and automatically in space and time without affecting unwanted targets. We believe RPOC will have important applications, when combined with photoactivable molecules, for better control of enzyme activities, high accuracy-controlled release, high precision optogenetics, and improved precision treatment. Applying digital logic functions in RPOC with photoswitchable fluorescent molecules would also enable recording and saving organelle interactions for live systems. Future research will focus on demonstrating the capabilities of RPOC in these applications.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

The invention may be embodied in other specific forms without departing from the spirit or essential characteristics thereof. The foregoing embodiments are therefore to be considered in all respects illustrative rather than limiting on the invention described herein.

EXAMPLES

Example 1: The RPOC Platform

A femtosecond laser source (InSight X3+, Spectra-Physics) is used for optical signal excitation and opto-control. The laser outputs two femtosecond pulse trains, one at a fixed wavelength of 1045 nm, and the other tunable from 690-1300 nm, both with ~100 fs pulse width. For stimulated Raman scattering (SRS) microscopy, the 1045 nm output is used as the Stokes beam and the tunable output is used as the pump beam. A single 150 mm SF-57 glass rod (Lattice Electro-Optics) is placed in the Stokes beam and two 150 mm SF-57 glass rods are placed after combining the two laser beams for the chirping of the pump and Stokes pulses to 3.4 ps and 1.8 ps, respectively. The laser beams double-pass the two glass rods for additional chirping. An AOM (M1205-P80L-0.5 with 532B-2 driver, Isomet) is used to modulate the Stokes beam for SRS microscopy. Hyperspectral SRS image stack is acquired by tuning the optical delay using a translational stage (X-LSM050A, Zaber Technologies) at 10 μm per step while collecting single-color images. The combined laser beams are directed to a 2D galvo scanner set (GVS002, Thorlabs) and then into an upright microscope (Olympus BX51). Either a 40×/0.8 NA (LUMPLFLN 40XW, Olympus) or a 60×/1.2 NA water immersion objective lens (UPLSAPO 60×, Olympus) is used to focus the laser beams onto the sample. Forward signals are collected using a 1.4 NA oil condenser. A 776 nm long-pass dichroic mirror (FF776-Di01-25×36, Semrock) is used to separate the TPEF signal from the input laser beams. The forward two-photon excitation fluorescence (TPEF) signals and the leaking of the control laser beam are detected after being reflected by the long-pass dichroic mirror. A combination of filters (FF01-575/59-25 or FF01-451/106-25, Semrock; ET4251p, Chroma) is used to detect the fluorescence signal and the leaking of control laser beams. The SRS signals are detected after transmission of the dichroic mirror using a photodiode (S3994, Hamamatsu) paired with a lab-designed tuned amplifier with a center frequency of 2.7 MHz. A short-pass filter (980SP, Chroma Technology) was used to block the Stokes beam from entering the photodiode. A lock-in amplifier (HF2LI, Zurich Instruments) was used to demodulate signals for SRS imaging. The lock-in amplifier and the AOM for Stokes beam modulation are synchronized by a function generator (DG1022Z, Rigol). In the epi-direction, two PMTs are installed to collect fluorescence signals at selected wavelength windows using different filters.

A portion of the tunable laser beam and the 1045 nm laser beam is frequency-doubled by BBO crystals (EKSMA Optics) to generate visible wavelengths for opto-control. The crystals are mounted on rotational mounts to optimize the second harmonic generation efficiency at different wavelengths. The selected visible laser beam is sent to another AOM (M133-aQ80L-1.5 with 522B driver, Isomet) which is controlled by comparator circuit boxes. The optical signal voltage is compared with a preset condition to determine the output TTL voltage for AOM control. The SRS signal output is delivered from the lock-in amplifier, while the fluorescence signal output is delivered from an amplifier (PMT3V4, Advanced Research Instrument Corporation) connected after the PMT.

Figure 7:
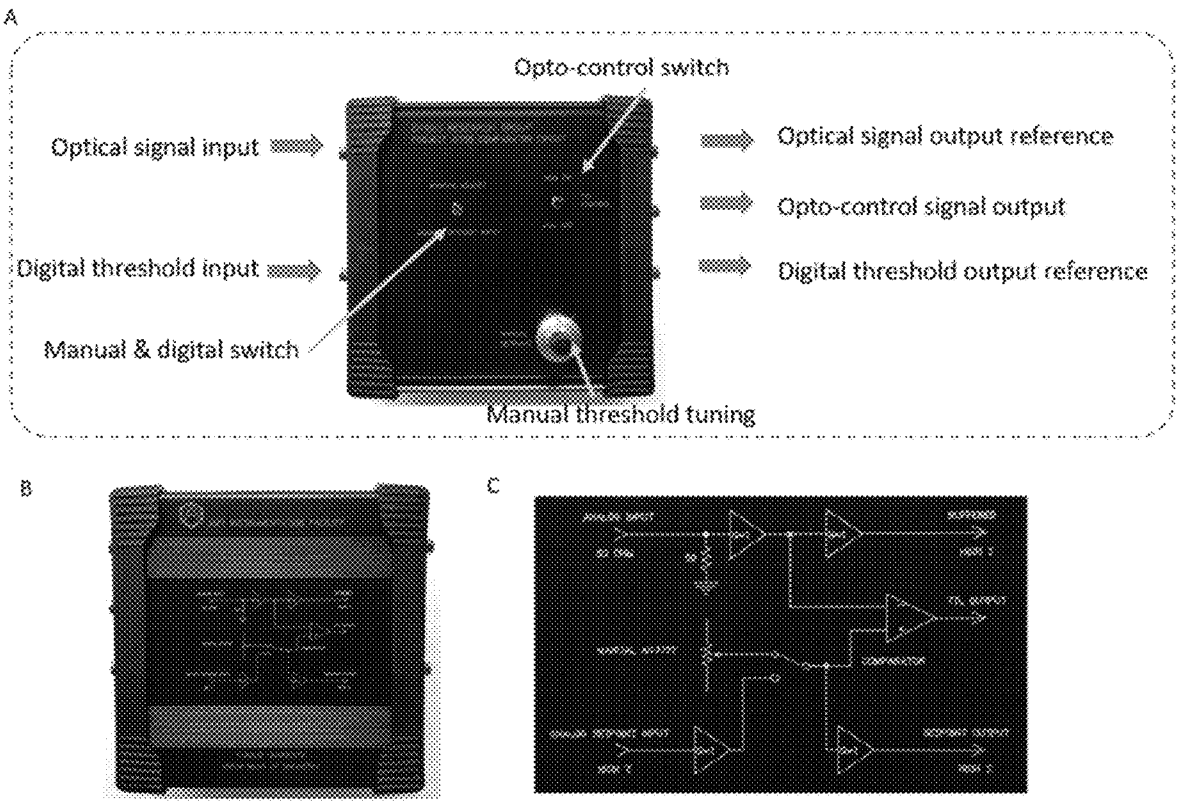
FIG. 7 panels A-C show the design of the comparator circuit box 1. (Panel A) The front of the comparator circuit box with explanations of ports and controls. (Panel B) The back of the comparator circuit box. (Panel C) The electronic configuration of the comparator circuit box.

The design of the comparator circuit box 1 with a single intensity threshold is illustrated in FIG. 7 panels A-C. Threshold voltage $V_T$ can be selected from either a manual tuning knob or a digital input. The circuits can be selected from 'AOM constantly on', 'AOM constantly off', and the 'opto-control' modes. The output TTL signal has a <0.7 V output as digital '0' and ~5V output as digital '1'. The signal output and digital threshold output references are also available. The design of the comparator circuit with digital logic is illustrated in FIG. 10 panels A-C. Aside from the same functions as the comparator box 1, a TTL digital input is available allowing this comparator box to be used together with the comparator box 1 for digital logic selections. Digital logic functions can be selected by using jumpers on 3-pin jumper bars. Connections of AND, OR, NAND, and NOR functions are illustrated in FIG. 3D and FIG. 16 panels A-C.

Example 2: Image Acquisition and Analysis

Images are saved as .txt files and processed using ImageJ for display. Pseudo-colors are used to represent different chemical compositions for SRS imaging and active pixels. Spectral or intensity profiles are plotted using Origin Pro. Particle trajectories are tracked using a particle tracker ImageJ plug-in. The parameters to analyze the 100-frame time-lapse SRS image stack and the active pixel stack are: radius=0, cutoff=3, percentile=0.5, link range=1, displacement=5. A single lipid droplet trajectory and the corresponding active-pixel trajectory are plotted using ImageJ particle tracker Plug-in together with images for display. Merging different image channels, image subtractions, particle analyses, and intensity integrations are performed using ImageJ built-in functions. Hyperspectral SRS images were analyzed using a spectral phasor plug-in in ImageJ. Plots of chemical maps are pseudocolor-coded for display.

Example 3: Cell Preparation

MIA PaCa-2 pancreatic cancer cells were purchased from ATCC and cultured in Dulbecco's Modified Eagle Medium (DMEM, ATCC) with 10% fetal bovine serum (FBS, ATCC) and 1% penicillin/streptomycin (Thermofisher Scientific). The cells were seeded in glass-bottom dishes (MatTek Life Sciences) with 2 mL culture media and then incubated in a CO2 incubator at 37° C. and 5% CO2 concentration. Cells were grown to about 50% confluency and were directly used for live-cell imaging or fixed with 10% buffered formalin phosphate (Fisher Scientific) for imaging.

Example 4: Preparation of CMTE and Control of CMTE in Cells

The chemical cis-1,2-dicyano1,2-bis(2,4,5-trimethyl-3-thienyl)ethene (CMTE) was purchased from Sigma Aldrich and prepared in dimethyl sulfoxide (DMSO) at a concentration of 25 mM. MIA PaCa-2 cancer cells were treated with 3.2 μL of the CMTE stock solution for a final concentration of 40 μM. Cells were incubated with CMTE for 8-12 hours before imaging. The combined pump and Stokes laser pulses can gradually switch the CMTE to the closed isomer 1*b* with strong signals at 1510 $cm^{-1}$. We deployed RPOC to selectively convert CMTE at different locations of the sample to the open cis isomer 1*a*, as illustrated in FIG. 4B.

ER tracker labeling of cells

MIA PaCa2 cells were first seeded in glass-bottom dishes and cultured overnight to reach 50%-70% confluency. ER tracker was added to the culture medium with a 3 μM final concentration. The cells were cultured for 30 min at 37° C. and 5% CO2 concentration before imaging. To generate sufficient TPEF signals, femtosecond laser pulses bypassing the chirping rods were directly used for signal generation.

Example 5: Estimation of the AOM Rise Time

The AOM rise time satisfies $$\tau_r = 0.65\frac{d}{V},$$

Here, d is the beam diameter, and Vis the acoustic velocity.

$$d = 2r = 1.22\frac{\lambda}{NA}$$

For the control laser beam at 522 nm and a NA value of 0.01, the beam diameter at the AOM crystal is $0.63\times10^{4}$ m. The acoustic velocity (V) inside the AOM crystal is 5800 m/s. This gives −7 ns AOM rise time for the control laser beam.

Example 6: The Design of the Comparator Circuit Box with a Single Intensity Threshold Selection In FIG. 7 panel A, the optical signal input shown on the left is compared with a voltage threshold that can be set manually using the manual threshold tuning nob or input from the digital threshold input port. The manual & digital switch selects the threshold selection mode. The opto-control TTL signal is output from the right middle port for AOM control. On the right side, two ports are available to deliver the optical signal output and the digital threshold output for references.

Example 7: The Spatial Resolution of the Imaging System

An SRS image from MIA PaCa2 cells was acquired to estimate the spatial resolution of the signal generation (FIG. 8 panels A-B). From the Gaussian fitting of a small feature in the image, the spatial resolution was estimated to be ≤373 nm. We estimate the TPEF to have a similar spatial resolution as the SRS.

Example 8: Beam Overlapping and RPOC Beam Size Estimation

To ensure optimized overlapping between the excitation and RPOC laser beams, we used fluorescence microparticles and compared images using both laser beams. FIG. 9 panels A-C illustrate the condition when the beams are not perfectly overlapped and FIG. 9 panels D-F show the condition with optimized beams. Beam optimization can be achieved by adjusting two mirrors only in the control laser beam.

From FIG. 9 panel G, we found that the widths of the same particle imaged using TPEF and 522 nm single-photon RPOC laser are 1.04 and 1.35 μm, respectively. The resolution of the TPEF is determined to be ~373 nm from fig. S2. Therefore, the spot size of the RPOC laser 'x' satisfies:

$$1.04 = 0.37\times 2 + a$$

$$1.35 = 2x + a$$

Here 'x' is the beam size of the 522 nm RPOC laser beam size, while 'a' is the size of the beads excluding the edges. The solution of these equations gives x=525 nm.

Example 9: The Design of the Comparator Circuit Box with the Digital Logic Function As shown in FIG. 10 panel A, similar functions to the comparator box 1 with a single threshold selection are available. Besides, a TTL input can be used to perform digital logic calculations with the comparison output from this box. This TTL input can be the TTL output from other comparator boxes. Inverters, an AND gate, and an OR gate are available to achieve different logic combinations.

One function of using two comparator boxes is to select an intensity range for RPOC. The connections of achieving such a function are shown in FIG. 11 and FIG. 3A.

The other function of using two comparator boxes is to perform logic calculations from two separate detectors for RPOC. The connections of achieving the AND function are illustrated in FIG. 13 and FIG. 3D. Electronic connections for achieving other logic functions are shown in FIG. 16 panels A-C.

Example 10: Spectral Phasor Analysis of Cells from Hyperspectral SRS Images

In FIG. 12, a single color SRS image, and segmented images highlighting different organelles including lipid droplets (LDs), endoplasmic reticulum (ER), nuclei, cytosol, and a composite image are shown. The ER can also be selected from simply intensity thresholds in SRS images. A single intensity range was used to select active pixels on ER in FIGS. 3B and C.

Example 11: Active Pixel Selection Using Digital Logic Signals from Two Detectors A mixture of fluorescent and nonfluorescent polystyrene (PS) beads and nicotinamide adenine dinucleotide hydrogen (NADH) crystals is used to demonstrate the digital AND function for active pixel determination. As shown in FIG. 14 panel A, an SRS image at the PS aromatic stretching band 3060 $cm^{-1}$ reveals all PS beads in the field of view. In the 450 nm fluorescence channel, both fluorescent PS beads and NADH crystals are visible (FIG. 14 panel B). The merging of the two channels highlights only the fluorescent PS beads in yellow (FIG. 14 panel C). Using SRS or fluorescence signals, the active pixels can be determined for all PS particles or all fluorescence molecules (FIG. 14 panels D-E). Using the AND function, active pixels are determined from pixels having signals in both SRS and fluorescence channels, which are the fluorescent PS beads (FIG. 14 panel F). Adjusting the $V_T$ from two comparator boxes allows optimization of active pixels selected using the AND function. FIG. 15 compares active pixels from the AND logic using different intensity thresholds selected for two comparator boxes. The optimal condition for selecting active pixels in this case is $V_{T1}$=0.02 or 0.05V, and $V_{T2}$=0.125V.

What is claimed is:

1. A system for controlling molecules, the system comprising:
- a first light source;
- a second light source;
- an acousto-optic modulator (AOM) coupled to the second light source; and
- control circuitry configured to:
  - receive a signal from the first light source that is interrogating a location in a sample that may contain a target molecule;
  - compare the signal received from the first light source to a preset signal; and
  - in the event that the signal received from the first light source meets or exceeds the preset signal, then the target molecule is present at the location in the sample and the control circuitry causes the AOM to activate the second light source to transmit light onto the location in the sample that contains the target molecule.

2. The system of claim 1, wherein the first light source and the second light source are each lasers.

3. The system of claim 2, wherein the first light source is configured for scanning.

4. The system of claim 1, wherein for each location, the compare process and the activate process occur within 30 nano-seconds of the receive process.

5. The system of claim 1, wherein in the event that the signal received from the first light source does not meet or exceed the preset signal, then the target molecule is not present at the location in the sample and the control circuitry causes the AOM to turn-off the second light source and no light is transmitted onto the location in the sample as the location does not contains the target molecule.

6. The system of claim 1, wherein control circuitry is configured to cause the acousto-optic modulator to operate in at least one mode selected from the group consisting of: AOM constantly on, AOM constantly off, and AOM control triggered by the compare step.

7. The system of claim 1, wherein the pre-set signal is a voltage threshold and the signal received from the first light source is converted into a sample voltage.

8. The system of claim 7, wherein when the sample voltage meets or exceeds the voltage threshold, the control circuitry then causes the AOM to activate the second light source to transmit light onto the location in the sample that contains the molecule.

9. The system of claim 7, wherein when the sample voltage does not meet or exceed the voltage threshold, the control circuitry then causes the AOM to turn-off the second light source and no light is transmitted onto the location in the sample as that location does not contains the molecule.

10. The system of claim 1, wherein each location is a pixel and the light from the second laser can be focused to solely the pixel that has been determined to contain the target molecule.

11. A method for controlling a molecule, the method comprising:
- receiving, to control circuitry, a signal from a first light source that is interrogating a location in a sample that may contain a target molecule;
- comparing, via the control circuitry, the signal received from the first light source to a preset signal; and
- in the event that the signal received from the first light source meets or exceeds the preset signal, then the target molecule is present at the location in the sample and causing, via the control circuitry, and causing an acousto-optic modulator (AOM) that is coupled to a second light source to activate the second light source to transmit light onto the location in the sample that contains the target molecule, wherein the light from the second light source controls the target molecule.

12. The method of claim 11, wherein the first light source and the second light source are each lasers.

13. The method of claim 12, wherein the first light source is configured for scanning.

14. The method of claim 11, wherein for each location, the comparing step and the activating step occur within 30 nano-seconds of the receiving step.

15. The method of claim 11, wherein in the event that the signal received from the first light source does not meet or exceed the preset signal, then the target molecule is not present at the location in the sample and the control circuitry causes the AOM to turn-off the second light source and no light is transmitted onto the location in the sample as the location does not contains the target molecule.

16. The method of claim 11, wherein control circuitry is configured to cause the acousto-optic modulator to operate in at least one mode selected from the group consisting of: AOM constantly on, AOM constantly off, and AOM control triggered by the compare step.

17. The method of claim 11, wherein the pre-set signal is a voltage threshold and the signal received from the first light source is converted into a sample voltage.

18. The method of claim 17, wherein when the sample voltage meets or exceeds the voltage threshold, the control circuitry then causes the AOM to activate the second light source to transmit light onto the location in the sample that contains the molecule.

19. The method of claim 17, wherein when the sample voltage does not meet or exceed the voltage threshold, the control circuitry then causes the AOM to turn-off the second light source and no light is transmitted onto the location in the sample as that location does not contains the molecule.

20. The method of claim 11, wherein each location is a pixel and the light from the second laser can be focused to solely the pixel that has been determined to contain the target molecule.

* * * * *